US009860404B2

United States Patent
Konishi

(10) Patent No.: US 9,860,404 B2
(45) Date of Patent: Jan. 2, 2018

(54) IMAGE FORMING SYSTEM TECHNIQUES FOR RESPONDING TO CONVEYANCE ABNORMALITIES

(71) Applicant: KONICA MINOLTA, INC., Chiyoda-ku, Tokyo (JP)

(72) Inventor: Hiroyuki Konishi, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/974,652

(22) Filed: Dec. 18, 2015

(65) Prior Publication Data
US 2016/0191733 A1    Jun. 30, 2016

(30) Foreign Application Priority Data

Dec. 24, 2014 (JP) .................................. 2014-260956

(51) Int. Cl.
*H04N 1/00* (2006.01)
*H04N 1/32* (2006.01)
(Continued)

(52) U.S. Cl.
CPC .......... *H04N 1/00602* (2013.01); *B65H 7/06* (2013.01); *B65H 7/20* (2013.01); *G03G 15/70* (2013.01);
(Continued)

(58) Field of Classification Search
CPC ........... H04N 1/00602; H04N 1/00925; H04N 1/0032; H04N 1/3263
(Continued)

(56) References Cited

U.S. PATENT DOCUMENTS 5,342,034 A * 8/1994 Mandel ................... B42C 1/125
                                                      109/56
5,502,545 A * 3/1996 Tsuruoka ........... G03G 15/0131
                                                      399/21
(Continued)

FOREIGN PATENT DOCUMENTS

JP    2002-173252 A    6/2002
JP    2005-274764 A    10/2005

OTHER PUBLICATIONS

Office Action (Notification of Reasons for Refusal) dated Jan. 10, 2017 by the Japanese Patent Office in corresponding Japanese Patent Application No. 2014-260956, and English language translation of Office Action (6 pages).

(Continued)

*Primary Examiner* — Eric A Rust
(74) *Attorney, Agent, or Firm* — Buchanan Ingersoll & Rooney PC

(57) ABSTRACT

An image forming system determines whether there is any recording material that is being conveyed in an image forming apparatus and that cannot be stopped at a predetermined position defined so as to avoid a location that causes a deformation of the recording material, when the conveying abnormality of the recording material is detected. Also, the image forming system determines whether there is any post processing apparatus in which the recording material can be stopped at an upstream side with respect to the post processing apparatus where the conveying abnormality occurs. Further, the image forming system discharges the recording material that cannot be stopped at the predetermined position in the image forming apparatus to a post processing apparatus at a downstream side with respect to the image forming apparatus and stops the recording material in the post processing apparatus.

17 Claims, 18 Drawing Sheets

(51) Int. Cl.
  *B65H 7/06* (2006.01)
  *B65H 7/20* (2006.01)
  *G03G 15/00* (2006.01)

(52) U.S. Cl.
  CPC ....... *H04N 1/0032* (2013.01); *H04N 1/00925* (2013.01); *B65H 2511/10* (2013.01); *B65H 2511/30* (2013.01); *G03G 15/5012* (2013.01); *G03G 15/6582* (2013.01); *G03G 2215/00426* (2013.01); *G03G 2215/00548* (2013.01); *G03G 2215/00721* (2013.01); *G03G 2221/1696* (2013.01)

(58) Field of Classification Search
  USPC ........................................................ 358/498
  See application file for complete search history.

(56) References Cited

U.S. PATENT DOCUMENTS

| | | | |
|---|---|---|---|
| 6,560,415 B2 | 5/2003 | Hirako et al. | |
| 2002/0071684 A1* | 6/2002 | Hirako | G03G 15/6529 399/18 |

OTHER PUBLICATIONS

Office Action (First Office Action) dated Jan. 16, 2017, by the State Intellectual Property Office of People's Republic of China in corresponding Chinese Patent Application No. 201510969826.3, and an English translation of the Office Action. (23 pages).

\* cited by examiner

FIG.3
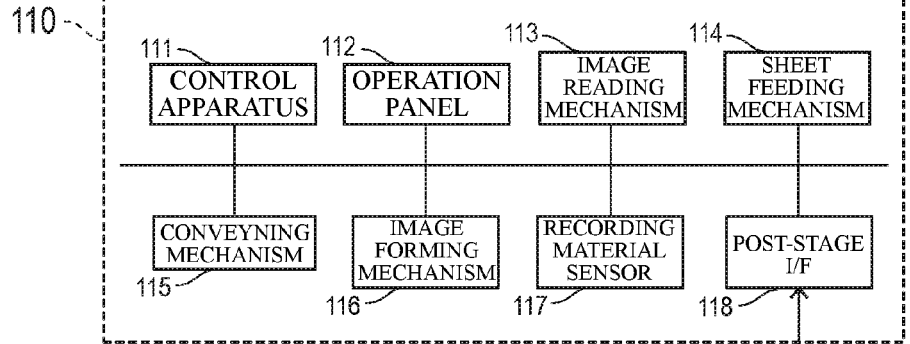
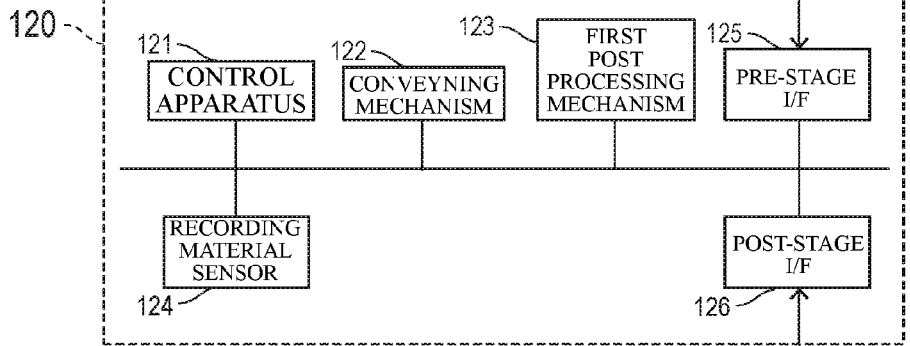
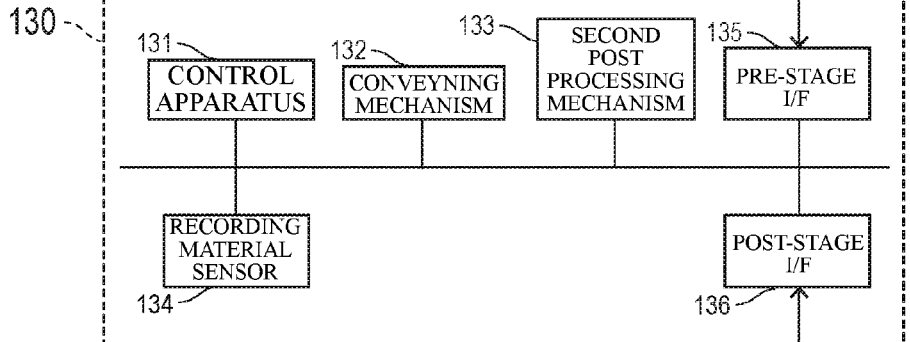
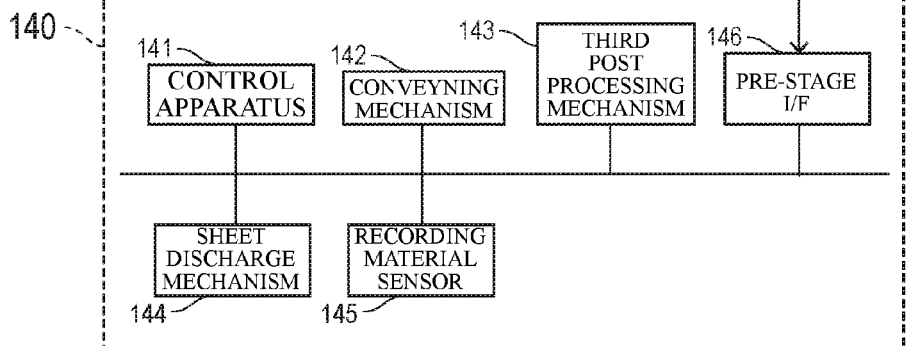

IMAGE FORMING SYSTEM TECHNIQUES FOR RESPONDING TO CONVEYANCE ABNORMALITIES

CROSS-REFERENCE TO RELATED APPLICATION

This application is based on Japanese Patent Application No. 2014-260956 filed on Dec. 24, 2014, the contents of which are incorporated herein by reference.

BACKGROUND

1. Technical Field

The present invention relates to an image forming system, a conveying stop method of a recording material, and a non-transitory computer readable recording medium recorded with a conveying stop program of a recording material.

2. Description of Related Art

In the past, image forming apparatuses such as a printer, a copy machine, a facsimile machine, and a multi-function peripheral having these functions are widely used. An image forming apparatus may be connected to a post processing apparatus that performs post process such as binding process and folding process on a recording material (a sheet and the like) formed with an image. Depending on the purpose, the combination of the image forming apparatus and the post processing apparatus is changed. In some cases, multiple post processing apparatuses may be coupled with a single image forming apparatus. In the following explanation, a system having an image forming apparatus and multiple post processing apparatuses will be referred to as an image forming system.

Recently, in an image forming system, when a conveying abnormality such as a jam occurs in a post processing apparatus, a recording material that is being conveyed in the image forming apparatus and the like is temporarily retracted to a predetermined position, and after the recording material that caused the conveying abnormality is removed, the retracted recording material is automatically discharged. The technique (function) for discharging the recording material as described above is referred to as an automatic purge (which may also be simply referred to as "purge"). When the automatic purge is performed, the user's work for removing the recording material remaining in the image forming system is alleviated.

However, the image forming apparatus includes a unit that causes the deformation of the recording material. For example, a unit that generates heat such as a fixing apparatus is one of such units. When a recording material is kept stopped in proximity to the position where such unit is installed, the recording material is deformed due to the effect of the heat, and after the recording material that caused the conveying abnormality is remove, the automatic purge cannot be performed. In order to solve this problem, a technique has been developed to stop a recording material by avoiding the position in proximity to the fixing apparatus when a conveying abnormality of a recording material occurs (for example, Japanese Patent Laid-Open No. 2005-274764).

However, when a limitation is imposed on the position where the recording material is stopped, the space in which the recording material can be retracted is reduced relative to the entire conveying path in the image forming apparatus. For this reason, there may be a recording material that cannot be retracted in the image forming apparatus.

SUMMARY

Objectives of the present invention are to provide an image forming system and the like capable of retracting all the recording materials that are being conveyed in an image forming apparatus even if a limitation is imposed on the position where a recording material is stopped, so that automatic purge can be performed later.

To achieve at least one of the abovementioned objectives, an image forming system reflecting one aspect of the present invention includes an image forming apparatus and a plurality of post processing apparatus. The image forming system includes an abnormality detection unit configured to detect a conveying abnormality of a recording material in a conveying path of the plurality of post processing apparatuses; a first determination unit, wherein in a case where the abnormality detection unit detects the conveying abnormality of the recording material, the first determination unit determines whether there is any recording material that is being conveyed in the image forming apparatus and that cannot be stopped at a predetermined position defined so as to avoid a location that causes a deformation of the recording material; a second determination unit, wherein in a case where the first determination unit determines that there is a recording material that cannot be stopped at the predetermined position in the image forming apparatus, the second determination unit determines whether there is any post processing apparatus in which the recording material can be stopped at an upstream side with respect to the post processing apparatus where the conveying abnormality occurs; and a stop control unit, wherein in a case where the second determination unit determines that there is a post processing apparatus in which the recording material can be stopped, the stop control unit discharges the recording material that cannot be stopped at the predetermined position in the image forming apparatus to a post processing apparatus at a downstream side with respect to the image forming apparatus and stops the recording material in the post processing apparatus.

In addition, it is preferable that the image forming system further comprises a purge processing unit, wherein after the recording material that caused the conveying abnormality detected by the abnormality detection unit is removed, the purge processing unit discharges a recording material remaining in the conveying path in the image forming system to an outside of the image forming system.

In addition, in the image forming system, it is preferable that, in a case where the second determination unit determines that there is not any post processing apparatus in which the recording material can be stopped, the stop control unit stops the recording material without conveying the recording material to the predetermined position.

In addition, in the image forming system, it is preferable that the second determination unit notifies first recording material information about the recording material that is determined not to be able to be stopped at the predetermined position in the image forming apparatus by the first determination unit to a most upstream first post processing apparatus of the post processing apparatuses, the image forming system further includes a third determination unit that determines whether there is any recording material that cannot be stopped at the predetermined position defined so as to avoid the location that causes the deformation of the recording material on the basis of the first recording material information, out of the recording materials that are being conveyed in the first post processing apparatus and the recording materials that are planned to be discharged from the image forming apparatus, and in a case where the third determination unit determines that there is a recording material that cannot be stopped at the predetermined position in the first post processing apparatus, the second determination unit determines that there is not any post processing apparatus in which the recording material can be stopped at an upstream side with respect to the post processing apparatus where a conveying abnormality occurs.

The objectives, features, and characteristics of this invention other than those set forth above will become apparent from the description given herein below with reference to preferred embodiments illustrated in the accompanying drawings.

BRIEF DESCRIPTION OF THE DRAWINGS

FIG. 3 is a block diagram illustrating an example of hardware configuration of the image forming system.

DETAILED DESCRIPTION

Figure 1:
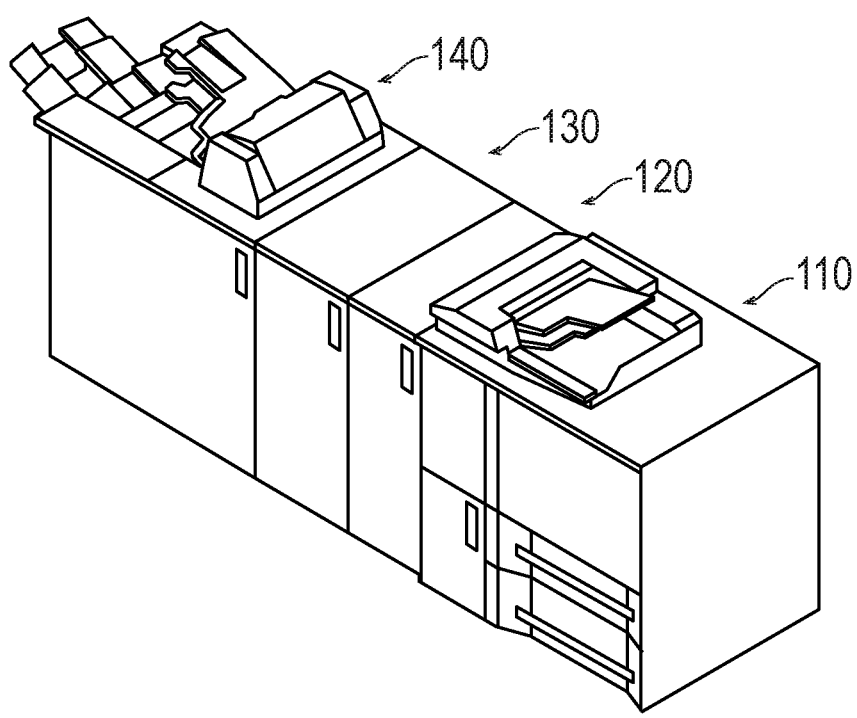
FIG. 1 is a perspective view illustrating an external appearance of an image forming system according to the present invention.

The embodiments of this invention will be described below with reference to the accompanying drawings. The same elements are denoted with the same reference numerals in the explanation about the drawings, and repeated explanation is omitted. The ratios of the dimensions of the drawings are exaggerated for the sake of explanation, and may be different from the actual ratios.

Figure 2:
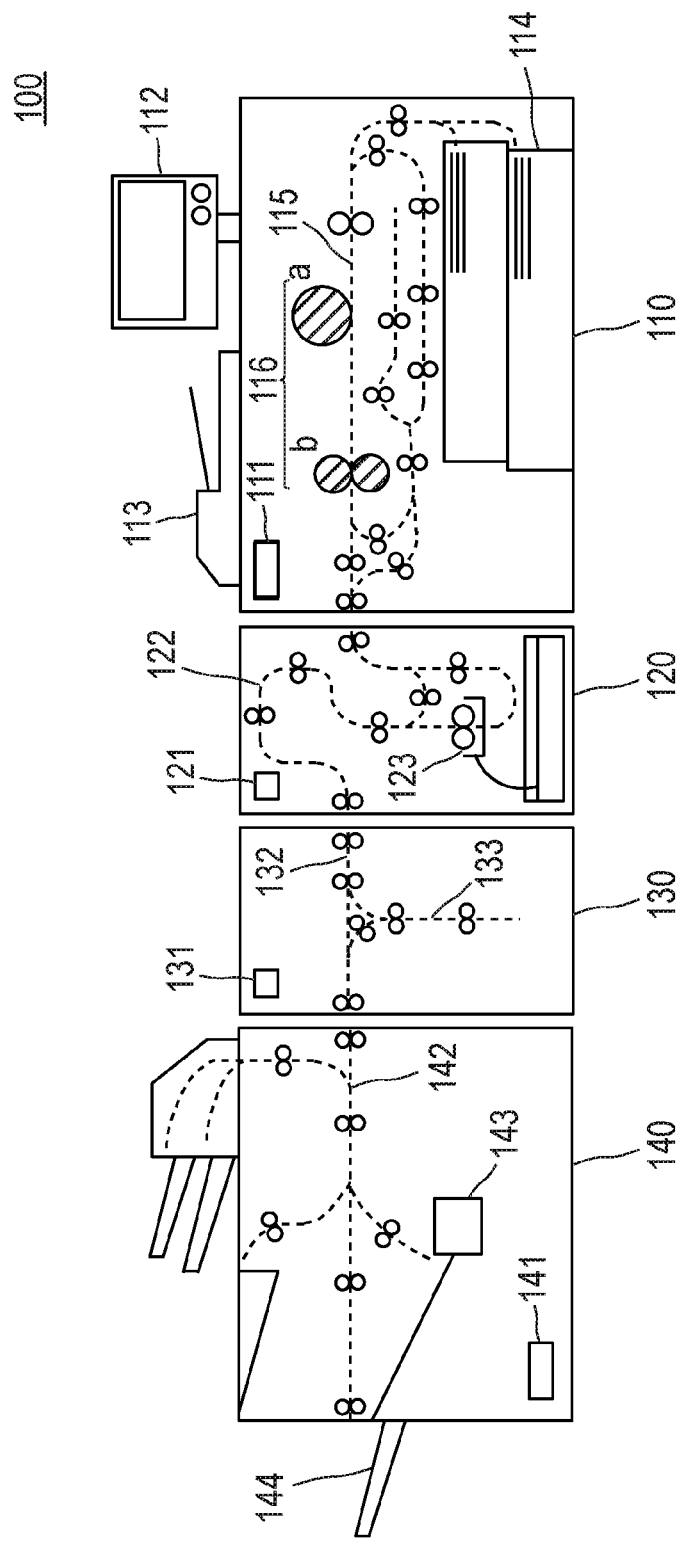
FIG. 2 is a figure illustrating an example of a schematic configuration of the image forming system.

FIG. 1 is a perspective view illustrating an external appearance of an image forming system according to the present invention. FIG. 2 is a figure illustrating an example of a schematic configuration of the image forming system. FIG. 3 is a block diagram illustrating an example of hardware configuration of the image forming system. Hereinafter, the schematic configuration of the image forming system 100 will be explained with reference to FIG. 1 to FIG. 3, and more particularly, the hardware configuration will be explained.

<Image Forming System 100 (Hardware Configuration)>
(1) Overall Configuration

As shown in FIG. 1 and FIG. 2, the image forming system 100 includes an image forming apparatus 110 and multiple post processing apparatuses 120 to 140. For example, from the upstream side along the conveying direction of recording materials such as sheets, the image forming apparatus 110, the first post processing apparatus 120, the second post processing apparatus 130, and the third post processing apparatus 140 are continuously connected (in the order as shown in the drawing).

The image forming apparatus 110 includes at least a print function, and forms an image on a recording material. In addition, the image forming apparatus 110 may have a copy function, a scan function, a facsimile function, and the like.

The first post processing apparatus 120 performs particular post processing on a recording material conveyed from the image forming apparatus 110. For example, the first post processing apparatus 120 is a humidification apparatus giving water content to a recording material. Bending, waving, undulation, and the like of the recording material is removed by giving water content. However, the first post processing apparatus 120 is not limited to the humidification apparatus, and may be a post processing apparatus having (or also using) other functions such as decurler for correcting curling of a recording material.

The second post processing apparatus 130 performs particular post processing on a recording material conveyed from the first post processing apparatus 120. For example, the second post processing apparatus 130 is a duplex conveying apparatus for reversing the front side and the back side of a recording material. However, the second post processing apparatus 130 is not limited to the duplex conveying apparatus, and may be a post processing apparatus having (or also using) other functions such as a saddle-stick binding apparatus for performing saddle-stick binding processing with folding, staples, and the like on recording materials.

The third post processing apparatus 140 performs particular post processing on a recording material conveyed from the second post processing apparatus 130. For example, the third post processing apparatus 140 is a side-stick binding apparatus for performing side-stick binding processing on stapling and the like on a bundle of recording materials. However, the third post processing apparatus 140 is limited to the side-stick binding apparatus, and may be a post processing apparatus having (or also using) other functions such as a stacking apparatus for stacking a bundle of recording materials on a sheet discharge tray in a staggered manner. Hereinafter, each apparatus will be explained.

(2) Image Forming Apparatus 110 (Hardware Configuration)

First, the hardware configuration of the image forming apparatus 110 will be explained.

As shown in FIG. 2 and FIG. 3, the image forming apparatus 110 includes a control apparatus 111, an operation panel 112, an image reading mechanism 113, a sheet feeding mechanism 114, a conveying mechanism 115, an image forming mechanism 116, a recording material sensor 117, and a later-stage interface (I/F) 118. The units 111 to 118 are connected with each other via a signal line (a bus and the like) for exchanging signals.

(2-1) Control Apparatus 111

The control apparatus 111 controls the entire image forming apparatus 110. For example, the control apparatus 111 includes a CPU (Central Processing Unit), a memory, and a storage, not shown.

The CPU is a control circuit constituted by a multi-core processor and the like executing various kinds of arithmetic operation processing and control of the units 112 to 118 in accordance with the program, and each function of the image forming apparatus 110 is achieved by causing the CPU to execute the program corresponding thereto.

The memory is a main storage apparatus that temporarily stores programs and data as a work area and that can be accessed at a high speed. For example, a DRAM (Dynamic Random Access Memory), an SDRAM (Synchronous Dynamic Random Access Memory), an SRAM (Static Random Access Memory), and the like are employed as the memory.

The storage is a large-capacity auxiliary storage apparatus that stores various kinds of programs and various kinds of data including the operating system. For example, a hard disk, a solid state drive, a flash memory, a ROM, and the like are employed as the storage.

(2-2) Operation Panel 112

The operation panel 112 is made by made by pasting a transparent touch panel (not shown) to a display surface side of a display (not shown). The touch panel identifies a touch position corresponding to an XY coordinate of an image displayed on a display, and converts the touch position into a coordinate and outputs the coordinate. It should be noted that the touch panel is constituted by a pressure sensitive-type or an electrostatic-type input detection device and the like. An input to the touch panel is performed with intuitive touch operation. For example, an input is performed by operation for touching a portion of a key (or a button, an icon, a tool bar, and a predetermined area) displayed on the display with a finger and a stylus (pen). The operation panel 112 may include physical keys such as numeric keys, a start key, a stop key, and the like.

(2-3) Image Reading Mechanism 113

The image reading mechanism 113 has a carriage equipped with a light source, an image sensor, and the like, which is provided under the original document platen, and controls a reciprocal movement of the carriage by driving a carriage driving motor to optically read a sheet original document placed on the original document platen. The image sensor is constituted by multiple sensor chips arranged in a main scanning direction, and includes a CIS (Contact Image Sensor), a CCD (Charge Coupled Device) image sensor, and the like. In a case where reading is performed while an ADF (Auto Document Feeder) conveys sheet original documents, the carriage is fixed at a predetermined position under an image reading window.

(2-4) Sheet Feeding Mechanism 114

The sheet feeding mechanism 114 feeds a recording material to the image forming mechanism 116. For example, the sheet feeding mechanism 114 employs a method for bringing a feeding/conveying roller into contact with the uppermost recording material stacked on the sheet feeding tray, and feeding the recording material with the frictional force thereof. The sheet feeding mechanism 114 (including the sheet feeding tray) may not be necessarily provided in the housing of the image forming apparatus 110, and may be installed as an external sheet feeding apparatus independent from the image forming apparatus 110.

(2-5) Conveying Mechanism 115

The conveying mechanism 115 conveys recording materials along the conveying path in the image forming apparatus 110. For example, the conveying mechanism 115 rotates a pair of conveying rollers with the driving of the conveying motor, conveys a recording material from the sheet feeding mechanism 114 to the image forming mechanism 116, and conveys a recording material having passed through the image forming mechanism 116 to the first post processing apparatus 120. During duplex printing, the conveying mechanism 115 reverses the front side and the back side of the recording material having passed through the image forming mechanism 116, and conveys the recording material to the image forming mechanism 116 again.

(2-6) Image Forming Mechanism 116

The image forming mechanism 116 uses a well-known image-forming process such as electro photographic process including the steps of charging, exposure, development, transfer, and fixing to form an image based on various kinds of data on a recording material.

For example, in the image forming mechanism 116, as shown in FIG. 1, a photosensitive drum is used as the image carrier 116a (in addition, an intermediate transfer belt may also be used). Toner images in each of the colors (Y, M, C, K) are respectively formed on the photosensitive drum by a charging roller, a development roller, and the like, and a bias having a polarity opposite to the toner is applied to the transfer roller, whereby the toner image on the photosensitive drum is transferred onto the recording material.

The recording material having the toner image formed thereon is separated from the surface of the photosensitive drum and conveyed to the heat application fixing apparatus 116b. The heat application fixing apparatus 116b fixes, as a permanent image, a toner image formed on a recording material by heat application, pressurization, and the like.

(2-7) Recording Material Sensor 117

The recording material sensor 117 detects the position of the recording material that is being conveyed in the image forming apparatus 110. For example, the recording material sensor 117 is constituted by a line sensor provided at a required position (not shown in FIG. 2) of the conveying path in the image forming apparatus 110.

(2-8) Later-Stage I/F 118

The later-stage I/F 118 is an interface for communicating with the first post processing apparatus 120 connected to the downstream side of the image forming apparatus 110. For example, various kinds of setting values and various kinds of control information which are required by the apparatuses 110 to 140 to cooperate and operate are transmitted and received via the later-stage I/F 118. In addition, recording material information about the recording material that is being conveyed (the number of sheets, the size, the position, the length in the conveying direction and the like), information indicating occurrence of conveying abnormality such as jam, and the like are also transmitted and received via the later-stage I/F 118.

(3) First Post Processing Apparatus 120 (Hardware Configuration)

Subsequently, the hardware configuration of the first post processing apparatus 120 will be explained.

As shown in FIG. 2 and FIG. 3, the first post processing apparatus 120 includes a control apparatus 121, a conveying mechanism 122, a first post processing mechanism 123, a recording material sensor 124, a preceding stage interface (I/F) 125, and a later-stage interface (I/F) 126. The units 121 to 126 are connected with each other via a signal line (a bus and the like) for exchanging a signal.

(3-1) Control Apparatus 121

The control apparatus 121 controls the entire first post processing apparatus 120. For example, like the control apparatus 111 of the image forming apparatus 110, the control apparatus 121 includes a CPU, a memory, and a storage, not shown.

(3-2) Conveying Mechanism 122

The conveying mechanism 122 conveys a recording material along the conveying path in the first post processing apparatus 120. For example, the conveying mechanism 122 rotates a pair of conveying rollers with the driving of the conveying motor, conveys a recording material conveyed from the image forming apparatus 110 to the first post processing mechanism 123, and conveys a recording material having passed through the first post processing mechanism 123 to the second post processing apparatus 130.

(3-3) First Post Processing Mechanism 123

The first post processing mechanism 123 sandwiches and conveys a recording material with a pair of humidification rollers. Water content is provided to the surface of the humidification rollers, and the entire surface of the passing recording material is uniformly humidified.

(3-4) Recording Material Sensor 124

Like the recording material sensor 117 of the image forming apparatus 110, the recording material sensor 124 detects the position of a recording material that is being conveyed in the first post processing apparatus 120.

(3-5) Preceding Stage I/F 125

The preceding stage I/F 125 is an interface for communicating with the image forming apparatus 110 connected to the upstream side of the first post processing apparatus 120.

(3-6) Later-Stage I/F 126

The later-stage I/F 126 is an interface for communicating with the second post processing apparatus 130 connected to the downstream side of the first post processing apparatus 120. It should be noted that the later-stage I/F 126 may be provided as the same configuration as the preceding stage I/F 125.

(4) Second Post Processing Apparatus 130 (Hardware Configuration)

Subsequently, the hardware configuration of the second post processing apparatus 130 will be explained.

As shown in FIG. 2 and FIG. 3, the second processing apparatus 130 includes a control apparatus 131, a conveying mechanism 132, a second post processing mechanism 133, a recording material sensor 134, a preceding stage interface (I/F) 135, and a later-stage interface (I/F) 136. The units 131 to 136 are connected with each other via a signal line (a bus and the like) for exchanging signals.

(4-1) Control Apparatus 131

The control apparatus 131 controls the entire second post processing apparatus 130. For example, like the control apparatus 111 of the image forming apparatus 110, the control apparatus 131 includes a CPU, a memory, and a storage, not shown.

(4-2) Conveying Mechanism 132

The conveying mechanism 132 conveys recording materials along the conveying path in the second post processing apparatus 130. For example, the conveying mechanism 132 rotates a pair of conveying rollers with the driving of the conveying motor, conveys a recording material conveyed from the first post processing apparatus 120 to the second post processing mechanism 133, and conveys a recording material having passed through the second post processing mechanism 133 to the third post processing apparatus 140.

(4-3) Second Post Processing Mechanism 133

The second post processing mechanism 133 is constituted by a switch back path formed in a substantially vertical (gravity) direction. A recording material is fed into a switch-back path, and the recording material is conveyed oppositely, so that the front side and the back side of the recording material can be reversed.

(4-4) Recording Material Sensor 134

Like the recording material sensor 117 of the image forming apparatus 110, the recording material sensor 134 detects the position of the recording material that is being conveyed in the second post processing apparatus 130.

(4-5) Preceding Stage I/F 135

The preceding stage I/F 135 is an interface for communicating with the first post processing apparatus 120 connected to the upstream side of the second post processing apparatus 130.

(4-6) Later-Stage I/F 136

The later-stage I/F 136 is an interface for communicating with the third post processing apparatus 140 connected to the downstream side of the second post processing apparatus 130.

(5) Third Post Processing Apparatus 140 (Hardware Configuration)

Subsequently, the hardware configuration of the third post processing apparatus 140 will be explained.

As shown in FIG. 2 and FIG. 3, the third post processing apparatus 140 includes a control apparatus 141, a conveying mechanism 142, a third post processing mechanism 143, a sheet discharge mechanism 144, a recording material sensor 145, and a preceding stage interface (I/F) 146. The units 141 to 146 are connected with each other via a signal line (a bus and the like) for exchanging a signal.

(5-1) Control Apparatus 141

The control apparatus 141 controls the entire third post processing apparatus 140. For example, like the control apparatus 111 of the image forming apparatus 110, the control apparatus 141 includes a CPU, a memory, and a storage, not shown.

(5-2) Conveying Mechanism 142

The conveying mechanism 142 conveys a recording material along the conveying path in the third post processing apparatus 140. For example, the conveying mechanism 142 rotates a pair of conveying rollers with the driving of the conveying motor, and conveys a recording material conveyed from the second post processing apparatus 130 to the third post processing mechanism 143.

(5-3) Third Post Processing Mechanism 143

The third post processing mechanism 143 staples the position away from the end of the bundle of the recording materials by a predetermined distance, and forms a book by performing side-stick binding of the bundle of the recording materials.

(5-4) Sheet Discharge Mechanism 144

The sheet discharge mechanism 144 discharges the recording materials having passed through the third post processing mechanism 143 (for example, a book bound as the side-stich) to the outside of the third post processing apparatus 140. For example, the sheet discharge mechanism 144 rotates a pair of sheet discharge rollers with the driving of the sheet discharge motor, and discharges the recording material to the sheet discharge tray.

(5-5) Recording Material Sensor 145

Like the recording material sensor 117 of the image forming apparatus 110, the recording material sensor 145 detects the position of a recording material that is being conveyed in the third post processing apparatus 140.

(5-6) Preceding Stage I/F 146

The preceding stage I/F 146 is an interface for communicating with the second post processing apparatus 130 connected to the upstream side of the third post processing apparatus 140.

<Image Forming System 100 (Functional Configuration)>

The image forming system 100 having the above hardware configuration has the following functional configuration.

Figure 4:
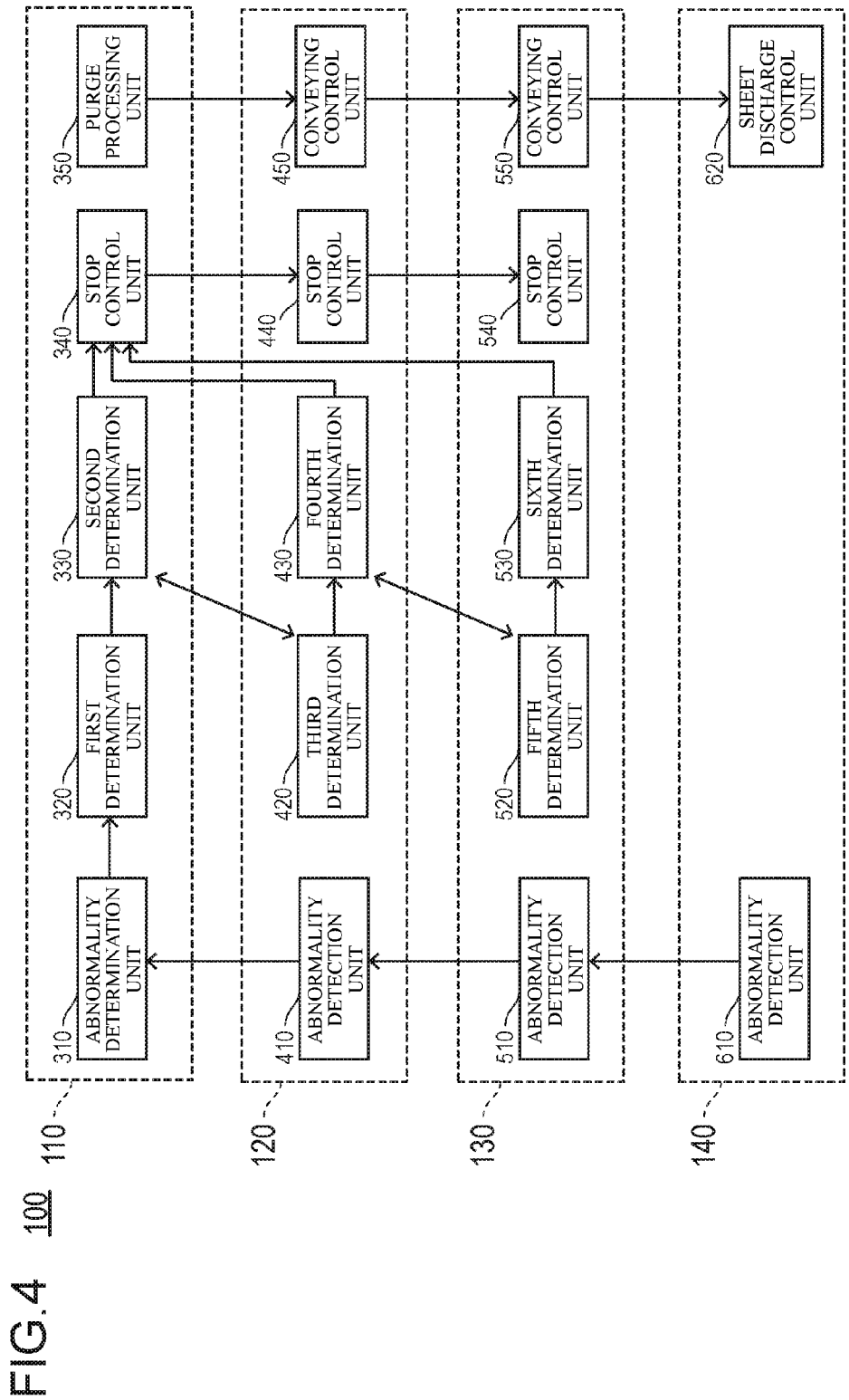
FIG. 4 is a block diagram illustrating an example of functional configuration of the image forming system.

FIG. 4 is a block diagram illustrating an example of functional configuration of the image forming system 100.

(1) Image Forming Apparatus 110 (Functional Configuration)

As shown in FIG. 4, the image forming apparatus 110 includes an abnormality determination unit 310, a first determination unit 320, a second determination unit 330, a stop control unit 340, and a purge processing unit 350.

The abnormality determination unit 310 determines whether a conveying abnormality of a recording material occurs or not in the conveying path in the image forming system 100, i.e., the conveying path of the image forming apparatus 110 and multiple post processing apparatuses 120 to 140. For example, when the abnormality determination unit 310 detects a conveying abnormality of a recording material in the conveying path of the image forming apparatus 110, the abnormality determination unit 310 determines that a conveying abnormality occurs in the image forming system 100. When the abnormality determination unit 310 is notified from the post processing apparatuses 120 to 140 that a conveying abnormality of a recording material occurs, the abnormality determination unit 310 determines that a conveying abnormality occurs in the image forming system 100.

In a case where an abnormality conveying of a recording material occurs, the first determination unit 320 determines whether there is any recording material of recording materials that is being conveyed and that cannot be stopped at a predetermined position in the image forming apparatus 110.

In this case, the predetermined position is defined so as to avoid a location that causes the deformation of the recording material in the image forming apparatus 110. For example, the location that causes deformation of the recording material includes, e.g., a location adjacent to the image carrier 116a and the heat application fixing apparatus 116b of the image forming mechanism 116 explained above. The charging roller, the development roller, the transfer roller, and the like are in pressurized contact with the surface of the image carrier 116a (photosensitive drum) with a predetermined pressure, and therefore, a frictional heat is generated when the photosensitive drum rotates. The heat application fixing apparatus 116b generates heat when a toner image is fixed to the recording material. When a recording material is stopped at a location adjacent to these heat sources for a long period of time, the recording material is affected by the heat and is deformed. For this reason, a limitation is imposed on the position where the recording material is stopped, so that the recording material is stopped only at predetermined positions avoiding the location causing deformation of the recording material.

In a case where there is a recording material that cannot be stopped at a predetermined position in the image forming apparatus 110, the second determination unit 330 determines whether there is any post processing apparatus in which the recording material can be stopped at the upstream side with respect to the post processing apparatus in which the conveying abnormality has occurred (a post processing apparatus of any one of the post processing apparatuses 120 to 140).

In addition, the second determination unit 330 notifies first recording material information about the recording material that is determined not to be able to be stopped at a predetermined position in the image forming apparatus 110 to the first post processing apparatus 120 which is the most upstream post processing apparatus via the later-stage I/F 118. In this case, the first recording material information includes the size of the recording material and the number of sheets.

In a case where it is determined that there is a post processing apparatus in which the recording material can be stopped, the stop control unit 340 discharges the recording material that cannot be stopped at the predetermined position in the image forming apparatus 110 to the post processing apparatus at the downstream with respect to the image forming apparatus 110. A recording material that is determined to be able to be stopped at the predetermined position in the image forming apparatus 110 is conveyed to the predetermined position and stopped. However, in a case where the stop control unit 340 determines that there is not any post processing apparatus in which the recording material can be stopped with at least one of the second determination unit 330, a fourth determination unit 430 explained later, and a sixth determination unit 530 explained later, the stop control unit 340 stops the recording material without conveying the recording material to the predetermined position.

After the user removes the recording material that caused the abnormality conveying, the purge processing unit 350 discharges the recording material remaining in the conveying path in the image forming system 100 to the outside of the image forming system 100. Discharge by the purge processing unit 350 will be referred to as an automatic purge (which may also be simply referred to as "purge"). More specifically, the purge processing unit 350 discharges the recording material remaining in the conveying path of the image forming apparatus 110 to the first post processing apparatus 120, and outputs a command of automatic purge to the first post processing apparatus 120.

It should be noted that each of the abnormality determination unit 310, the first determination unit 320, the second determination unit 330, the stop control unit 340, and the purge processing unit 350 is achieved by causing the CPU to read a program installed in the storage to the memory and execute the program in the image forming apparatus 110. However, the abnormality determination unit 310, the first determination unit 320, the second determination unit 330, the stop control unit 340, and the purge processing unit 350 are not limited thereto, and each of the function units 310 to 350 may be achieved by hardware such as ASIC.

(2) First Post Processing Apparatus 120 (Functional Configuration)

As shown in FIG. 4, the first post processing apparatus 120 includes an abnormality detection unit 410, a third determination unit 420, a fourth determination unit 430, a stop control unit 440, and a conveying control unit 450.

The abnormality detection unit 410 detects a conveying abnormality of a recording material in the conveying path of the first post processing apparatus 120. For example, the abnormality detection unit 410 detects a jam and the like of a recording material on the basis of a signal that is output by the recording material sensor 124.

The third determination unit 420 determines whether there is any recording material that is being conveyed in the first post processing apparatus 120 and is planned to be discharged from the image forming apparatus 110 and that cannot be stopped at the predetermined position in the first post processing apparatus 120 on the basis of the first recording material information.

In this case, the predetermined position is defined so as to avoid a location that causes the deformation of the recording material in the first post processing apparatus 120. For example, the location that causes the deformation of the recording material includes, e.g., a location adjacent to the first post processing mechanism 123 that has been explained above. The humidification roller of the first post processing mechanism 123 includes water content, and therefore, when the recording material is stopped for a long period of time while the recording material is in contact with the humidification roller, the recording material is affected by the water content and the recording material is deformed. For this reason, a limitation is imposed on the position where the recording material is stopped, so that the recording material is stopped only at the predetermined position avoiding the location that causes the deformation of the recording material.

In a case where it is determined that there is a recording material that cannot be stopped at the predetermined position of the first post processing apparatus 120, the fourth determination unit 430 determines whether there is any post processing apparatus in which the recoding material can be stopped at the upstream side with respect to the post processing apparatus where the conveying abnormality has occurred and at the downstream side with respect to the first post processing apparatus 120.

The fourth determination unit 430 notifies second recording material information about the recording material that is determined not to be able to be stopped at the predetermined position of the first post processing apparatus 120 to the second post processing apparatus 130 which is the second most upstream post processing apparatus. In this case, the second recording material information includes the size of the recording material and the number of sheets.

In a case where it is determined that there is a post processing apparatus in which the recording material can be stopped, the stop control unit 440 discharges a recording material that cannot be stopped at the predetermined position of the first post processing apparatus 120 to the post processing apparatus which is at the downstream of the first post processing apparatus 120. A recording material that is determined to be able to be stopped at the predetermined position of the first post processing apparatus 120 is conveyed to the predetermined position and stopped. However, in a case where at least the fourth determination unit 430 determines that there is not any post processing apparatus in which the recording material can be stopped, the stop control unit 440 stops the recording material without conveying the recording material to the predetermined position.

When the automatic purge is executed, the conveying control unit 450 transfers the recording material conveyed from the image forming apparatus 110 to the second post processing apparatus 130 at the downstream. In addition, the recording material remaining in the conveying path in the first post processing apparatus 120 is discharged to the second post processing apparatus 130, and a command of automatic purge is output to the second post processing apparatus 130.

It should be noted that each of the abnormality detection unit 410, the third determination unit 420, the fourth determination unit 430, the stop control unit 440, and the conveying control unit 450 is achieved by causing the CPU to read a program installed in the storage to the memory and execute the program in the first post processing apparatus 120. However, the abnormality detection unit 410, the third determination unit 420, the fourth determination unit 430, the stop control unit 440, and the conveying control unit 450 are not limited thereto, and each of the function units 410 to 450 may be achieved by hardware such as ASIC.

(3) Second Post Processing Apparatus 130 (Functional Configuration)

As shown in FIG. 4, the second post processing apparatus 130 includes an abnormality detection unit 510, a fifth determination unit 520, a sixth determination unit 530, a stop control unit 540, and a conveying control unit 550.

The abnormality detection unit 510 detects a conveying abnormality of a recording material in the conveying path of the second post processing apparatus 130. For example, the abnormality detection unit 510 detects a jam and the like of a recording material on the basis of a signal that is output by the recording material sensor 134.

The fifth determination unit 520 determines whether there is any recording material that is being conveyed in the second post processing apparatus 130 and is planned to be discharged from the first post processing apparatus 120 and that cannot be stopped at the predetermined position in the second post processing apparatus 130 on the basis of the second recording material information.

In this case, the predetermined position is defined so as to avoid a location that causes the deformation of the recording material in the second post processing apparatus 130. However, in the present embodiment, it is considered that there is not any location that causes the deformation of the recording material in the second post processing apparatus 130.

In a case where it is determined that there is a recording material that cannot be stopped at the predetermined position in the second post processing apparatus 130, the sixth determination unit 530 determines whether there is any post processing apparatus in which the recoding material can be stopped at the upstream side with respect to the post processing apparatus where the conveying abnormality has occurred and at the downstream side with respect to the second post processing apparatus 130.

However, in the present embodiment, the third post processing apparatus 140 is the most downstream post processing apparatus. Therefore, the sixth determination unit 530 would not determine that there is a post processing apparatus in which the recoding material can be stopped at the upstream side with respect to the post processing apparatus where the conveying abnormality has occurred and at the downstream side with respect to the second post processing apparatus 130.

In a case where it is determined that there is a post processing apparatus in which the recording material can be stopped, the stop control unit 540 discharges the recording material that cannot be stopped at the predetermined position in the second post processing apparatus 130 to a post processing apparatus at the downstream of the second post processing apparatus 130. A recording material that is determined to be able to be stopped at the predetermined position in the second post processing apparatus 130 is conveyed to the predetermined position and is stopped. However, in a case where at least the sixth determination unit 430 determines that there is not any post processing apparatus in which the recording material can be stopped, the stop control unit 540 stops the recording material without conveying the recording material to the predetermined position.

When the automatic purge is executed, the conveying control unit 550 transfers a recording material conveyed from the first post processing apparatus 120 to the third post processing apparatus 140 at the downstream. In addition, the recording material remaining in the conveying path in the second post processing apparatus 130 is discharged to the third post processing apparatus 140, and a command of automatic purge is output to the third post processing apparatus 140.

It should be noted that each of the abnormality detection unit 510, the fifth determination unit 520, the sixth determination unit 530, the stop control unit 540, and the conveying control unit 550 is achieved by causing the CPU to read a program installed in the storage to the memory and execute the program in the second post processing apparatus 130. However, the abnormality detection unit 510, the fifth determination unit 520, the sixth determination unit 530, the stop control unit 540, and the conveying control unit 550 are not limited thereto, and each of the function units 510 to 550 may be achieved by hardware such as ASIC.

(4) Third Post Processing Apparatus 140 (Functional Configuration)

As shown in FIG. 4, the third post processing apparatus 140 includes an abnormality detection unit 610 and a sheet discharge control unit 620.

The abnormality detection unit 610 detects a conveying abnormality of a recording material in the conveying path of the third post processing apparatus 140. For example, the abnormality detection unit 610 detects a jam and the like of a recording material on the basis of a signal that is output by the recording material sensor 145.

When the automatic purge is executed, the sheet discharge control unit 620 discharges a recording material conveyed from the second post processing apparatus 130 to the outside of the third post processing apparatus 140 (sheet discharge tray and the like).

It should be noted that each of the abnormality detection unit 610 and the sheet discharge control unit 620 is achieved by causing the CPU to read a program installed in the storage to the memory and execute the program in the third post processing apparatus 140. However, the abnormality detection unit 610 and the sheet discharge control unit 620 are not limited thereto, and each of the function units 610, 620 may be achieved by hardware such as ASIC.

<Operation of Image Forming System 100>

Subsequently, the distinctive operation of the image forming system according to the present invention 100 will be explained.

(1) Abnormality Detection Process

Figure 5:
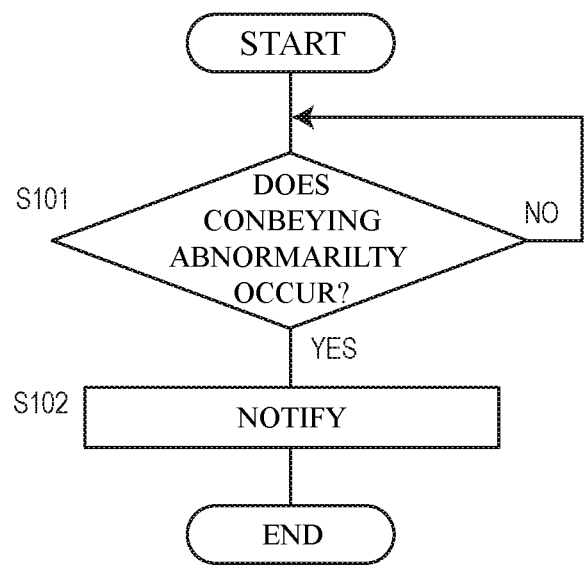
FIG. 5 is a flowchart illustrating a procedure of abnormality detection process executed in an image forming apparatus and a post processing apparatus.
Figure 6:
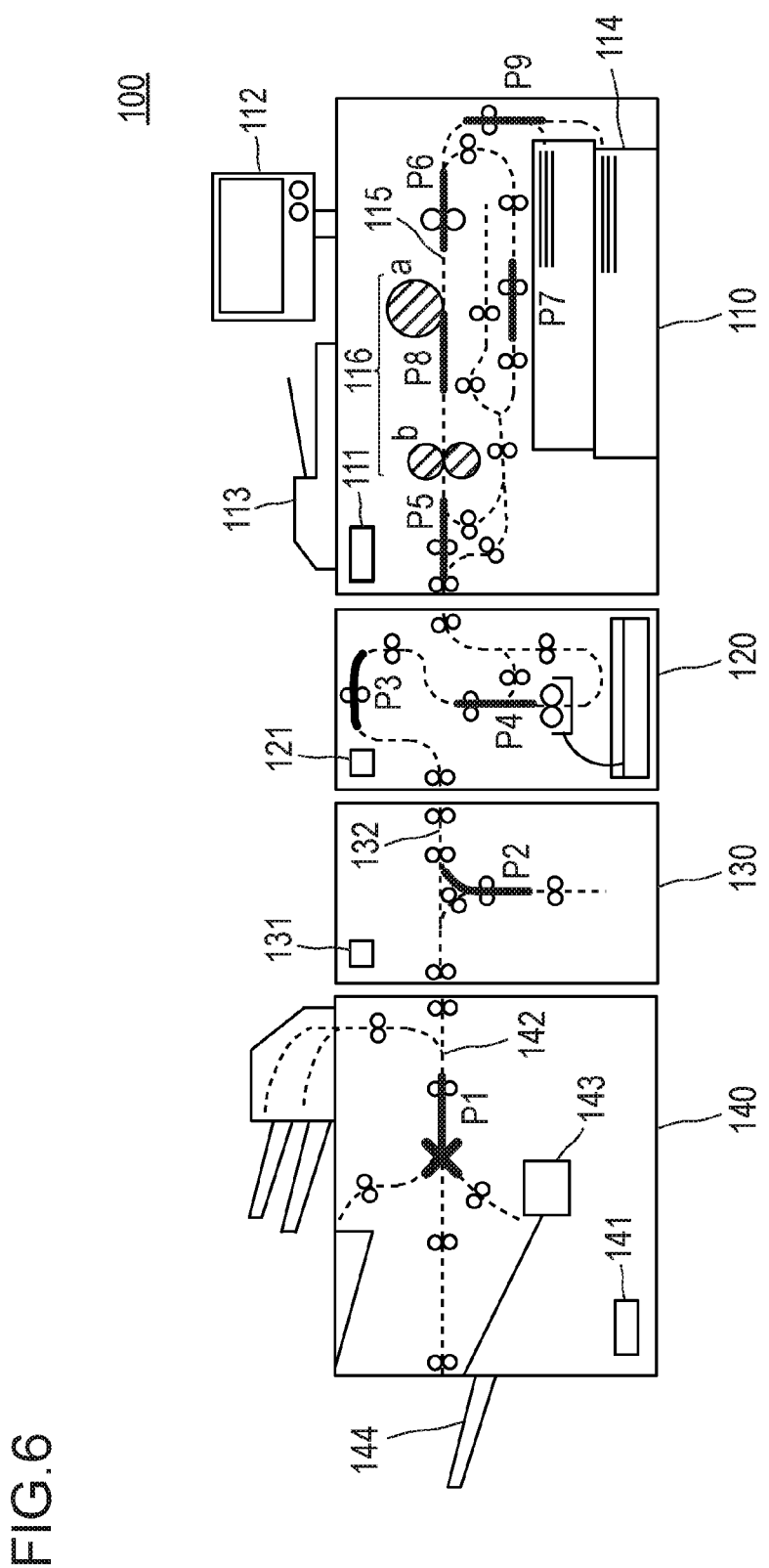
FIG. 6 is a figure illustrating an example 1 of positions of recording materials (A4 size) when a conveying abnormality occurs.
Figure 7:
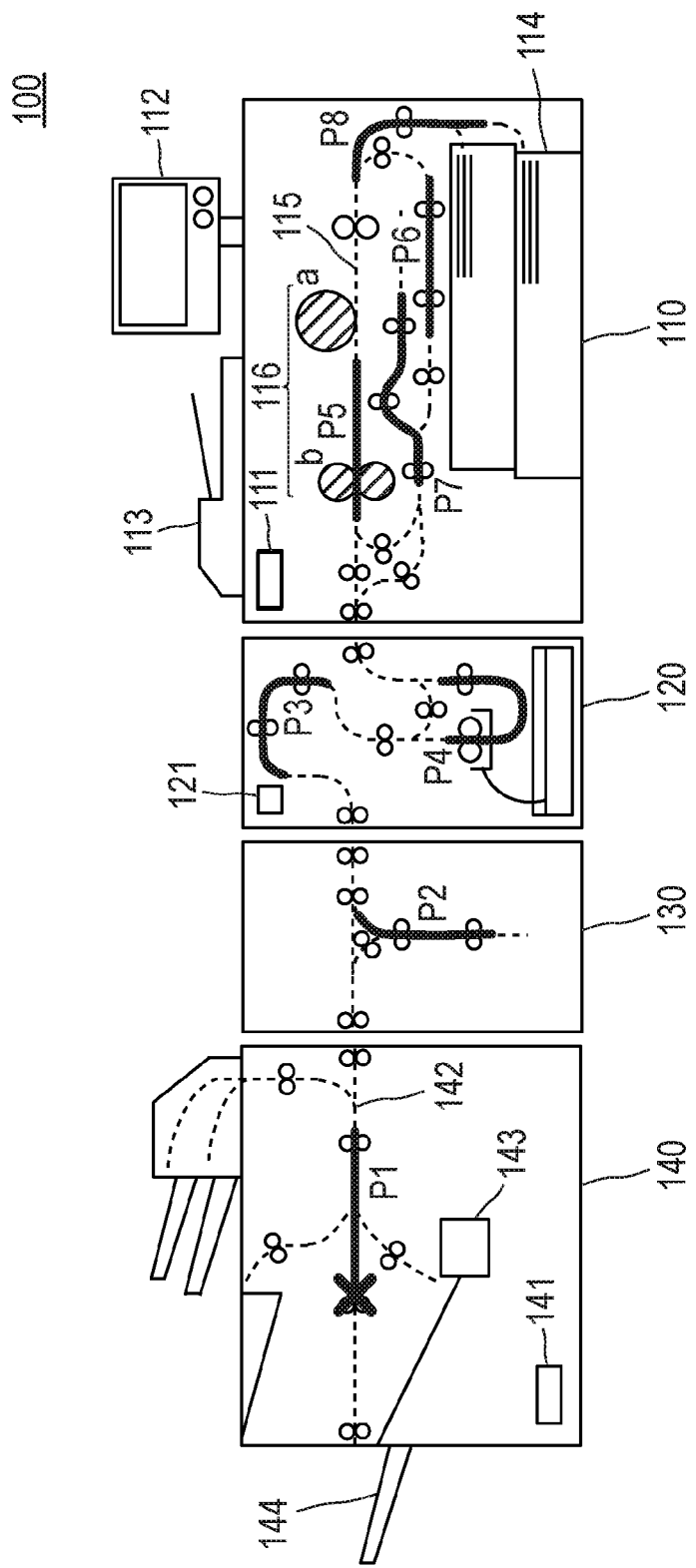
FIG. 7 is a figure illustrating an example 2 of positions of recording materials (A3 size) when a conveying abnormality occurs.

FIG. 5 is a flowchart illustrating a procedure of abnormality detection process executed by the image forming apparatus and the post processing apparatus. FIG. 6 is a figure illustrating an example 1 of positions of recording materials (A4 size) when a conveying abnormality occurs. FIG. 7 is a figure illustrating an example 2 of positions of recording materials (A3 size) when a conveying abnormality occurs.

Hereinafter, abnormality detection process will be explained with reference to FIG. 5 to FIG. 7.

Each of the image forming apparatus 110, the first post processing apparatus 120, the second post processing apparatus 130, and the third post processing apparatus 140 starts abnormality detection process as shown in FIG. 5 with timing when the power is turned on. However, the timing for starting the abnormality detection process is not limited thereto, and when print process explained later is started in the image forming apparatus 110, the abnormality detection process may be started.

It should be noted that the abnormality detection process executed by the image forming apparatus 110 and each of the post processing apparatuses 120 to 140 are the same process, and therefore, in the following explanation, only the abnormality detection process executed by the third post processing apparatus 140 will be explained as a representing case.

(Step S101)

When the abnormality detection process is started, the third post processing apparatus 140 functions as the abnormality detection unit 610, and detects a conveying abnormality of a recording material (jam and the like). For example, the third post processing apparatus 140 calculates, as a transit time of a recording material, a time from when a recording material sensor 145 provided on the conveying path in the third post processing apparatus 140 detects the front edge of a recording material to when the material sensor 145 detects the rear edge thereof. Then, in a case where the calculated transit time of the recording material is more than a predetermined threshold value, the third post processing apparatus 140 detects it as an abnormality conveying of a recording material.

In a case where an abnormality conveying of a recording material cannot be detected (step S101: NO), the third post processing apparatus 140 waits until the abnormality conveying is detected. On the other hand in a case where an abnormality conveying of a recording material is detected (step S101: YES), the third post processing apparatus 140 subsequently performs the process in step S102.

(Step S102)

The third post processing apparatus 140 functions as an abnormality detection unit 610, and notifies detection of an abnormality conveying of a recording material to the upstream apparatuses (for example, the image forming apparatus 110, the first post processing apparatus 120, and the second post processing apparatus 130). For example, the third post processing apparatus 140 transmits information indicating occurrence of an abnormality conveying of a recording material to the image forming apparatus 110, the first post processing apparatus 120, and the second post processing apparatus 130 via the preceding stage I/F 146. In this case, information indicating occurrence of an abnormality conveying of a recording material includes at least information about the position of the recording material that caused the conveying abnormality (P1 in FIG. 6, FIG. 7).

When a conveying abnormality of a recording material is notified to each of the apparatuses 110 to 130, all the recording materials that are being conveyed in the apparatus (except the recording material P1 that caused the conveying abnormality) is stopped at that position (P2 to P9 in FIGS. 6, 7).

Thereafter, the third post processing apparatus 140 terminates the abnormality detection process.

However, in a case where the image forming apparatus 110 executes the above abnormality detection process, the "third post processing apparatus 140" is read as the "image forming apparatus 110" in step S101. The "abnormality detection unit 610" is read as the "abnormality determination unit 310". The "recording material sensor 145" is read as the "recording material sensor 117". The process in step S102 is omitted.

In a case where the first post processing apparatus 120 executes the abnormality detection process explained above, the "third post processing apparatus 140" is read as the "first post processing apparatus 120" in each step. The "abnormality detection unit 610" is read as the "abnormality detection unit 410". The "recording material sensor 145" is read as the "recording material sensor 124". The "preceding stage I/F 146" is read as the "preceding stage I/F 125".

In a case where the second post processing apparatus 130 executes the abnormality detection process explained above, the "third post processing apparatus 140" is read as the "second post processing apparatus 130" in each step. The "abnormality detection unit 610" is read as the "abnormality detection unit 510". The "recording material sensor 145" is read as the "recording material sensor 134". The "preceding stage I/F 146" is read as the "preceding stage I/F 135".

When the abnormality detection process explained above is executed by each of the image forming apparatus 110 and each of the post processing apparatuses 120 to 140, a conveying abnormality of a recording material that has occurred in the image forming system 100 can be immediately detected.

(2) Print Process

Figure 8:
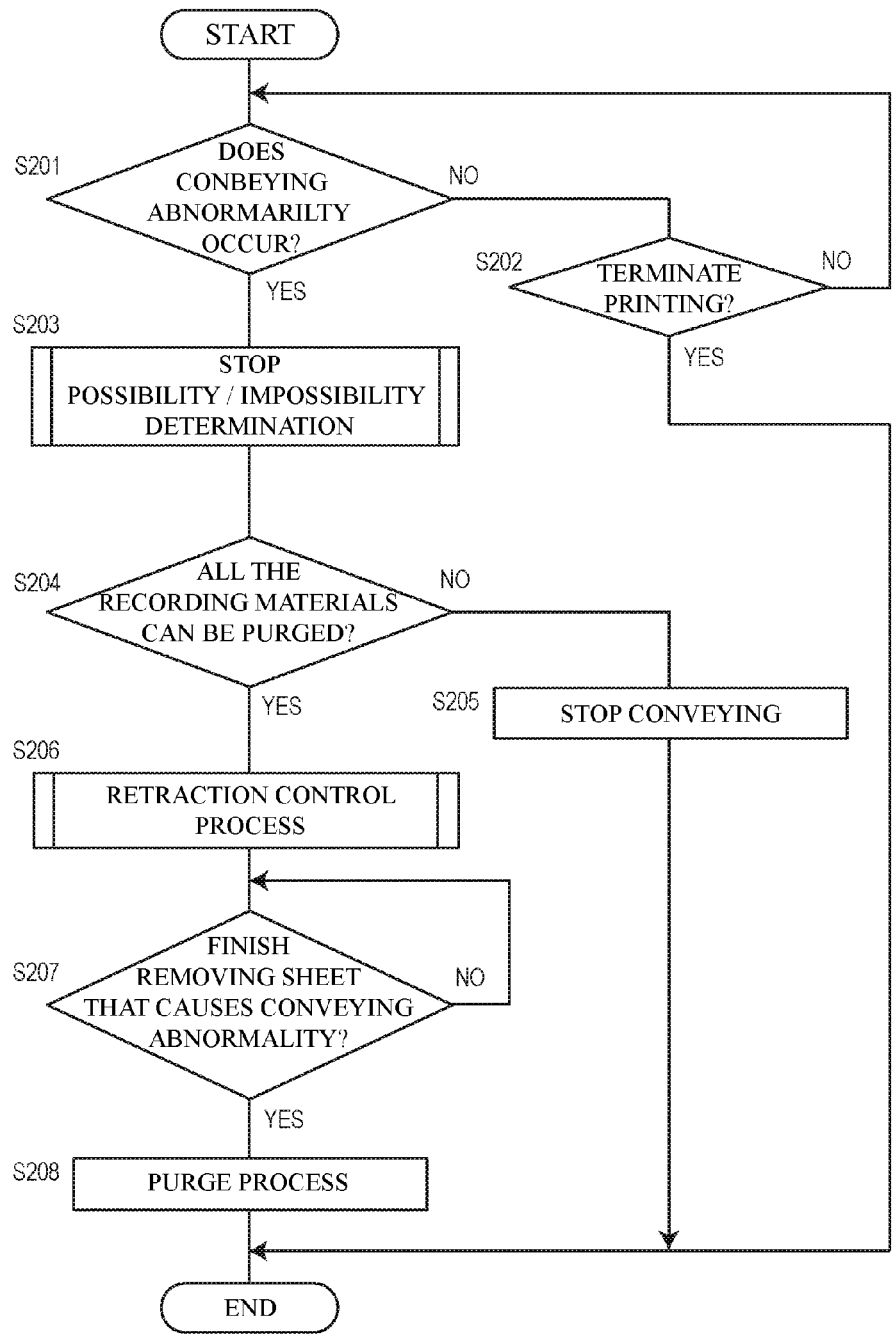
FIG. 8 is a flowchart illustrating a procedure of printing process executed by the image forming apparatus.

FIG. 8 is a flowchart illustrating a procedure of print process executed by the image forming apparatus.

The image forming apparatus 110 starts the print process as shown in FIG. 8 with timing at which a command of printing is received from the user. However, the timing for starting the print process is not limited thereto. Alternatively, when a command of copying is received from the user, the print process may be started. Still alternatively, when print data or facsimile data are received from the outside, the print process may be started.

When the print process is started, the image forming apparatus 110 causes the sheet feeding mechanism 114 and the conveying mechanism 115 to convey each of the recording materials from the sheet feeding tray to the position of the image forming mechanism 116, and forms an image based on various kinds of data such as print data and the like on each of the recording materials. Then, the image forming apparatus 110 successively conveys a recording material having an image or images formed on one side or both sides to the post processing apparatuses 120 to 140 at the downstream. Each of the post processing apparatuses 120 to 140 applies predetermined post processing to each recording material, and discharges the recording material from the third post processing apparatus 140.

(Step S201)

At this occasion, the image forming apparatus 110 functions as the abnormality determination unit 310, and determines whether a conveying abnormality of a recording material occurs in the conveying path in the image forming system 100 or not. More specifically, in a case where a conveying abnormality is detected in the conveying path of the image forming apparatus 110 in step S101 of the abnormality detection process explained above, the image forming apparatus 110 determines that a conveying abnormality of a recording material occurs in the conveying path in the image forming system 100. In a case where a conveying abnormality is notified from at least one of the post processing apparatuses 120 to 140 in step S102 of the abnormality detection process explained above, the image forming apparatus 110 also determines that a conveying abnormality of a recording material occurs in the conveying path in the image forming system 100. On the other hand, in a case where abnormality is not detected in the image forming apparatus 110 and abnormality is not notified from the post processing apparatuses 120 to 140, it is determined that any abnormality does not occur.

In a case where it is determined that any conveying abnormality of a recording material does not occur in the conveying path in the image forming system 100 (step S201: NO), the image forming apparatus 110 subsequently performs the process in step S202. On the other hand, in a case where it is determined that a conveying abnormality of a recording material occurs in the conveying path in the image forming system 100 (step S201: YES), the image forming apparatus 110 subsequently performs the process in step S203.

(Step S202)

The image forming apparatus 110 determines whether all the planned prints have been finished or not on the basis of the number of printed pages and the like. In a case where the image forming apparatus 110 determines that all the planned prints have not been finished (step S202: NO), the image forming apparatus 110 returns back to the process in step S201. The process in step S201 and step S202 is repeated while any conveying abnormality does not occur and printing is executed normally. On the other hand, in a case where all the planned prints have been finished normally (step S202: YES), the image forming apparatus 110 stops the rotation of all the conveying rollers, and finishes the process.

(Step S203)

The image forming apparatus 110 functions as the first determination unit 320 and the second determination unit 330, and executes stop possibility/impossibility determination process for determining whether all the recording materials that are being conveyed in the image forming system 100 can be stopped at predetermined positions so as to allow the automatic purge later. In this case, the predetermined positions are defined so as to avoid surrounding portions of the image forming mechanism 116 and the first post processing mechanism 123. Therefore, the image forming apparatus 110 determines whether all the recording materials can be stopped on the conveying path in the image forming system 100 by avoiding the positions of P4, P5, P8 in FIG. 6 and the positions of P4, P5 in FIG. 7. The details of the stop possibility/impossibility determination process will be explained later.

(Step S204)

In a case where the image forming apparatus 110 determines that all the recording materials that are being conveyed in the image forming system 100 can be stopped at the predetermined positions in step S203 (step S204: YES), the image forming apparatus 110 subsequently performs the process in step S206. On the other hand, in a case where the image forming apparatus 110 determines that even a single recording material that is being conveyed in the image forming system 100 cannot be stopped at a predetermined position (step S204: NO), the image forming apparatus 110 subsequently performs the process in step S205.

(Step S205)

The image forming apparatus 110 functions as the stop control unit 340, and stops the conveying control of the recording material. More specifically, the rotation of all the conveying rollers is stopped. Therefore, when the process in step S205 is performed, a recording material stops at the current position even in a case where the recording material is in proximity to the location that causes the deformation of the recording material.

In addition, the image forming apparatus 110 likewise causes the post processing apparatuses, which are at the upstream side with respect to the post processing apparatus where a conveying abnormality occurs, to stop conveying of the recording materials. In the example as shown in FIGS. 6, 7, the image forming apparatus 110 commands the first post processing apparatus 120 and the second post processing apparatus 130, which are at the upstream side with respect to the third post processing apparatus 140 where a conveying abnormality occurs, to stop conveying the recording materials. In accordance with this command, the first post processing apparatus 120 functions as the stop control unit 440, and stops conveying all the recording materials in the first post processing apparatus 120. The second post processing apparatus 130 functions as the stop control unit 540, and stops conveying of all the recording materials in the second post processing apparatus 130 without delay.

For example, when the recording materials are being conveyed at the positions P2 to P9 as shown in FIGS. 6, 7 when a conveying abnormality of a recording material occurs, each of the image forming apparatus 110, the first post processing apparatus 120, and the second post processing apparatus 130 stops the recording materials at the positions of P2 to P9.

(Step S206)

The image forming apparatus 110 functions as the stop control unit 340, and executes retraction control process for retracting (stopping) all the recording materials that are being conveyed in the image forming system 100 to the predetermined positions before the purge process (automatic purge). The details of the retraction control process will be explained later.

(Step S207)

The image forming apparatus 110 functions as the purge processing unit 350, and determines whether the recording material that caused the conveying abnormality is removed by the user or not. More specifically, in a case where the image forming apparatus 110 receives a notification indicating that the state of the conveying abnormality has been cancelled from the post processing apparatus where a conveying abnormality occurs (the third post processing apparatus 140 in the example as shown in FIGS. 6, 7), the image forming apparatus 110 determines that the recording material that caused the conveying abnormality has been removed by the user.

It should be noted that the post processing apparatus (for example, the third post processing apparatus 140) sends a notification indicating that the state of the conveying abnormality has been cancelled to the image forming apparatus 110 when the recording material sensor can no longer detect the recording material that caused the conveying abnormality and the cover of the post processing apparatus is closed.

Then, unless the image forming apparatus 110 receives a notification indicating that the state of the conveying abnormality has been cancelled, the image forming apparatus 110 determines that the recording material that caused the conveying abnormality has not yet been removed (step S207: NO), and the image forming apparatus 110 waits until the recording material is removed. On the other hand, in a case where the image forming apparatus 110 determines that the recording material that caused the conveying abnormality is removed by the user (step S207: YES), the image forming apparatus 110 subsequently performs the process in step S208.

(Step S208)

The image forming apparatus 110 functions as the purge processing unit 350, and executes the purge process for discharging the recording material remaining in the conveying path in the image forming system 100 to the outside of the image forming system 100.

More specifically, the image forming apparatus 110 controls the conveying mechanism 115, and successively conveys all the recording materials remaining in the conveying path of the image forming apparatus 110 to the first post processing apparatus 120. At this occasion, the first post processing apparatus 120 functions as the conveying control unit 450, and controls the conveying mechanism 122 to successively convey all the recording materials remaining in the first post processing apparatus 120 (including the recording materials conveyed from the image forming apparatus 110) to the second post processing apparatus 130. Subsequently, the second post processing apparatus 130 functions as the conveying control unit 550 and controls the conveying mechanism 132 to successively convey all the recording materials remaining in the second post processing apparatus 130 (including the recording materials conveyed from the first post processing apparatus 120) to the third post processing apparatus 140. Further, the third post processing apparatus 140 functions as the sheet discharge control unit 620, and controls the conveying mechanism 142 and the sheet discharge mechanism 144 to successively discharge all the recording materials remaining in the third post processing apparatus 140 (including the recording materials conveyed from the second post processing apparatus 130) to the outside.

After the purge process as described above is finished, the image forming apparatus 110 terminates the print process. However, in a case where there still remains printing that has not yet been completed, the image forming apparatus 110 resumes printing and may return to the process in step S201.

The above print process is executed by the image forming apparatus 110, and therefore, even in a case where a limitation is imposed on the position where the recording material is stopped, all the recording materials that are being conveyed in the image forming system 100 can be retracted before the automatic purge.

(3) Stop Possibility/Impossibility Determination Process S203

Figure 9:
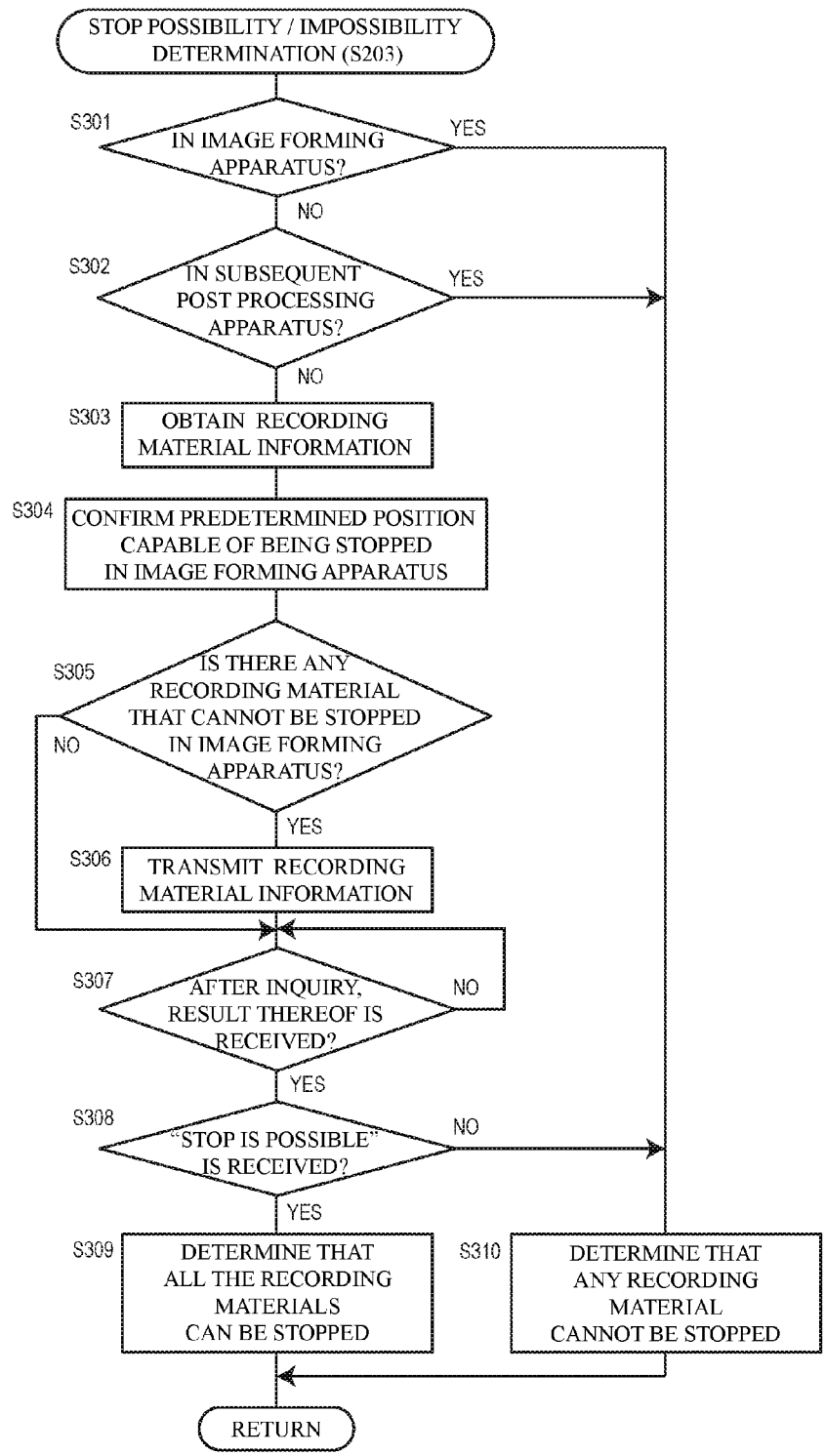
FIG. 9 is a flowchart illustrating a procedure of stop possibility/impossibility determination process executed in the image forming apparatus.
Figure 10:
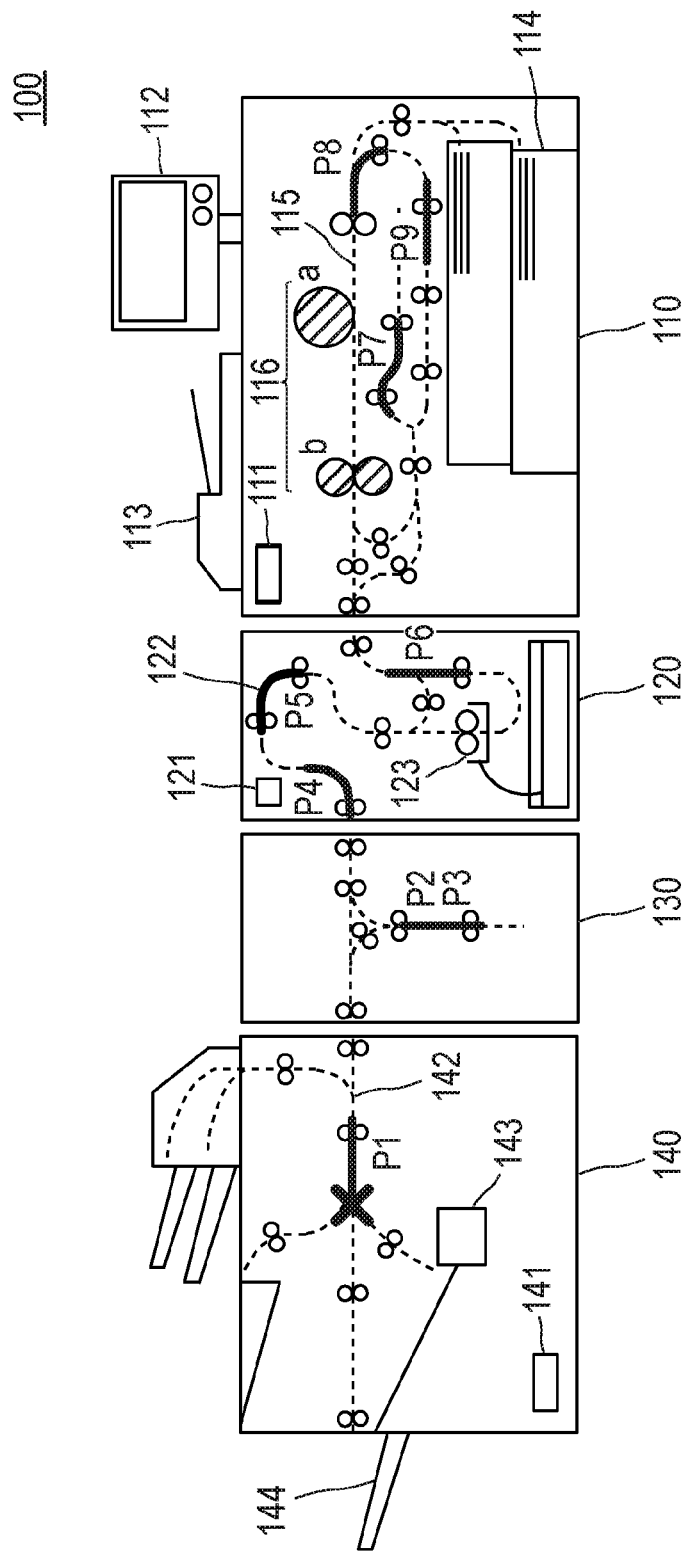
FIG. 10 is a figure illustrating an example 1 of predetermined positions for stopping recording materials (A4 size).
Figure 11:
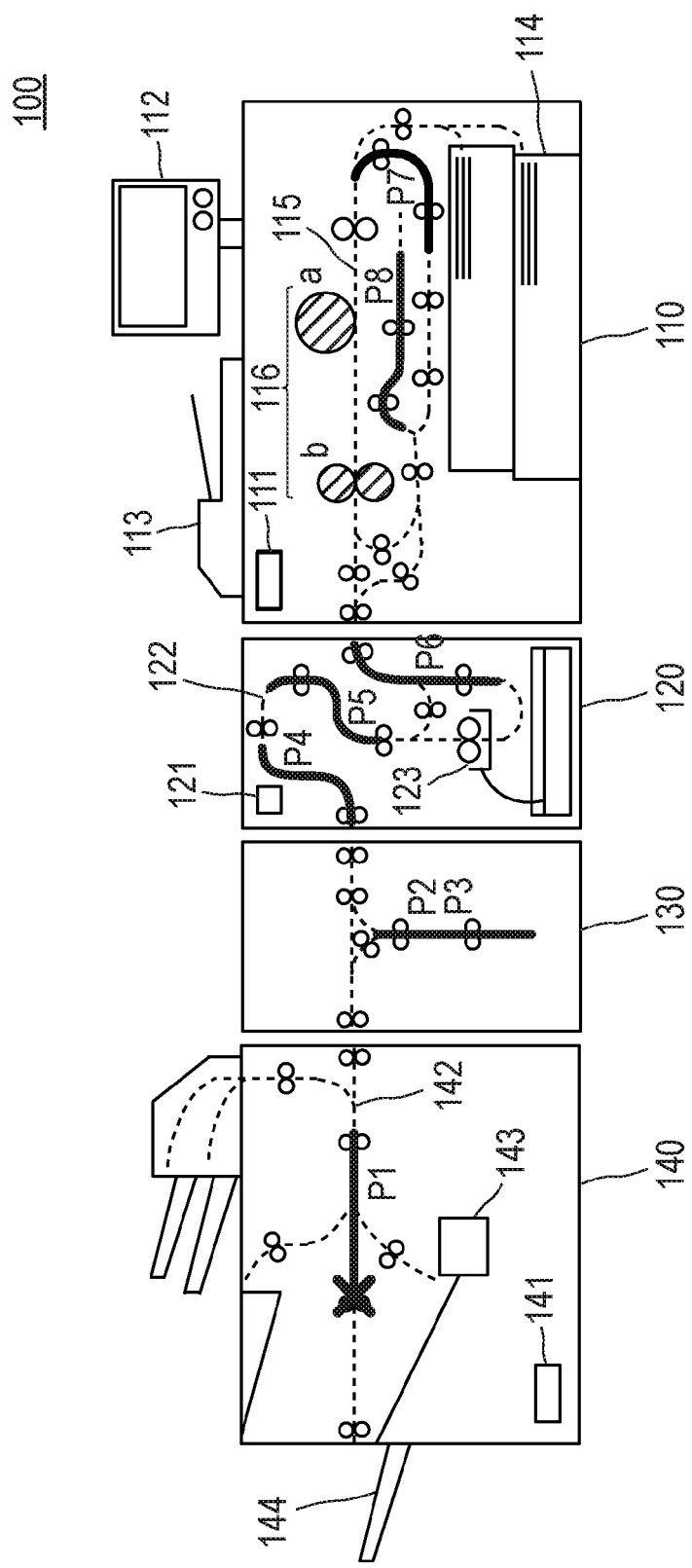
FIG. 11 is a figure illustrating an example 2 of predetermined positions for stopping recording materials (A3 size).

FIG. 9 is a flowchart illustrating a procedure of stop possibility/impossibility determination process executed by the image forming apparatus. FIG. 10 is a figure illustrating an example 1 of predetermined positions for stopping recording materials (A4 size). FIG. 11 is a figure illustrating an example 2 of predetermined positions for stopping recording materials (A3 size). Hereinafter, the stop possibility/impossibility determination process will be explained with reference to FIG. 9 to FIG. 11.

As described above, when the process proceeds to step S203 of the print process, the image forming apparatus 110 starts stop possibility/impossibility determination process as shown in FIG. 9.

(Step 301)

When the stop possibility/impossibility determination process is started, the image forming apparatus 110 functions as the abnormality determination unit 310, and determines whether a conveying abnormality of a recording material occurs in the image forming apparatus 110 or not. For example, in a case where a conveying abnormality is detected in the conveying path of the image forming apparatus 110 in step S101 of the abnormality detection process, the image forming apparatus 110 determines that a conveying abnormality occurs in the image forming apparatus 110. On the other hand, in a case where a conveying abnormality is notified from the post processing apparatuses 120 to 140 in step S102 of the abnormality detection process, the image forming apparatus 110 determines that any conveying abnormality does not occur in the image forming apparatus 110.

In a case where the image forming apparatus 110 determines that a conveying abnormality occurs in the image forming apparatus 110 (step S301: YES), the recording materials in the image forming apparatus 110 cannot be moved, and accordingly, the image forming apparatus 110 subsequently performs the process in step S310.

(Step S302)

The image forming apparatus 110 functions as the abnormality determination unit 310, and determines whether a conveying abnormality of a recording material occurs in the first post processing apparatus 120 in the immediately proximity. For example, in a case where a conveying abnormality is notified from the first post processing apparatus 120 in step S102 of the abnormality detection process, the image forming apparatus 110 determines that a conveying abnormality occurs in the first post processing apparatus 120. On the other hand, in a case where a conveying abnormality is notified from the post processing apparatuses 130, 140 at the downstream with respect to the first post processing apparatus 120 in step S102 of the abnormality detection process, the image forming apparatus 110 determines that any conveying abnormality does not occur in the first post processing apparatus 120.

In a case where the image forming apparatus 110 determines that a conveying abnormality occurs in the first post processing apparatus 120 (step S302: YES), the recording material in the image forming apparatus 110 cannot be discharged to the post processing apparatuses 120 to 140 at the downstream, and therefore, the subsequently performs the process in step S310. On the other hand, in a case where the image forming apparatus 110 determines that any conveying abnormality does not occur in the first post processing apparatus 120 (step S302: NO), the image forming apparatus 110 subsequently performs the process in step S303.

Therefore, when the process in step S303 is performed, there may be a case where a conveying abnormality occurs neither in the image forming apparatus 110 nor the first post processing apparatus 120.

(Step S303)

The image forming apparatus 110 functions as the first determination unit 320, and obtains first recording material information about a recording material that is being conveyed in the image forming apparatus 110.

For example, the image forming apparatus 110 calculates, as an elapsed time of a recording material, a time from when each recording material sensor 117 provided on the conveying path of the image forming apparatus 110 detects the front edge of a recording material at each position to when the recording material sensor 117 detects the rear edge thereof. Then, the image forming apparatus 110 identifies the size of the recording material (A4, A3, and the like) that is being conveyed in the image forming apparatus 110 in accordance with the calculated transit time of the recording material.

The image forming apparatus 110 uses the recording material sensor 117 provided at the position (the entrance of the conveying path) where the recording material is fed from the sheet feeding tray by the feeding/conveying roller to calculate the number of sheets A of the recording materials that have passed the position. At the same time, the image forming apparatus 110 uses the recording material sensor 117 provided at the position (the exit of the conveying path) where the recording material is discharged from the image forming apparatus 110 to the first post processing apparatus 120 to calculate the number of sheets B of the recording materials that have passed the position. Then, the image forming apparatus 110 identifies the number of sheets of the recording materials that are being conveyed in the image forming apparatus 110 by subtracting the number of sheets B from the number of sheets A.

The image forming apparatus 110 saves the size of the recording material and the number of sheets identified as described above to a memory and the like as the first recording material information about the recording materials that are being conveyed in the image forming apparatus 110. However, the method for identifying the size of the recording material and the number of sheets is not limited thereto.

(Step S304)

The image forming apparatus 110 functions as the first determination unit 320, and confirms the predetermined position in the image forming apparatus 110 which are defined so as to avoid the location that causes the deformation of the recording material. For example, information indicating the predetermined position is stored in the storage and the like in advance, and the image forming apparatus 110 can confirm the predetermined position in the image forming apparatus 110 by reading the information to the memory and the like.

In this case, the information indicating the predetermined position is different according to the size of the recording material that is being conveyed in the image forming apparatus 110. For example, in a case where the size of the recording material identified in step S303 is "A4", the number of predetermined positions (P7, P8, P9) defined so as to avoid the surrounding portion of the image forming mechanism 116 (which is three positions) is read as the information indicating the predetermined position as shown in FIG. 10. In a case where the size of the recording material identified in step S303 is "A3", the number of predetermined positions (P7, P8) defined so as to avoid the surrounding portion of the image forming mechanism 116 (which is two positions) is read as the information indicating the predetermined position as shown in FIG. 11.

(Step S305)

The image forming apparatus 110 functions as the first determination unit 320, and determines whether there is any recording material that is being conveyed in the image forming apparatus 110 and that cannot be stopped at the predetermined positions in the image forming apparatus 110 so as to avoid the location that causes the deformation of the recording material.

For example, in a case where the number of sheets of the recording materials identified in step S303 (the number of sheets that are being conveyed in the image forming apparatus 110) is more than the number of predetermined positions confirmed in step S304, the image forming apparatus 110 determines that there is a recording material that cannot be stopped at the predetermined position. On the other hand, in a case where the number of sheets of the recording materials identified in step S303 is equal to or less than the number of predetermined positions confirmed in step S304, the image forming apparatus 110 determines that all the recording materials that are being conveyed in the image forming apparatus 110 can be stopped at the predetermined positions.

In a case where there is a recording material that cannot be stopped at the predetermined position in the image forming apparatus 110 (step S305: YES), the image forming apparatus 110 subsequently performs the process in step S306. On the other hand, in a case where it is determined that all the recording materials that are being conveyed in the image forming apparatus 110 can be stopped at the predetermined positions (step S305: NO), the image forming apparatus 110 omits the process in step S306, and subsequently performs the process in step S307.

(Step S306)

The image forming apparatus 110 functions as the second determination unit 330, and notifies first recording material information about the recording materials that are determined not to be able to be stopped at the predetermined positions in the image forming apparatus 110 in step S305 to the first post processing apparatus 120 which is the most upstream post processing apparatus in the post processing apparatus. For example, the image forming apparatus 110 extracts the first recording material information about the recording materials that are determined not to be able to be stopped at the predetermined positions in the image forming apparatus 110 from the first recording material information saved in the memory and the like in step S303, and transmits the first recording material information to the first post processing apparatus 120.

(Step S307)

The image forming apparatus 110 functions as the second determination unit 330, and inquires as to whether the recording materials that are determined not to be able to be stopped at the predetermined positions in the image forming apparatus 110 in step S305 can be stopped at the predetermined positions of the first post processing apparatus 120. In this case, the predetermined positions are defined so as to avoid the location that causes the deformation of the recording material (for example, first post processing mechanism 123) in the first post processing apparatus 120.

In a case where there is already a recording material that is being conveyed in the first post processing apparatus 120, the image forming apparatus 110 also takes the existence of the recording material into consideration. More specifically, the image forming apparatus 110 inquires as to whether all the recording materials, which is the summation of the recording materials that are being conveyed in the first post processing apparatus 120 and the recording materials that are determined not to be able to be stopped at the predetermined positions in the image forming apparatus 110, can be stopped at the predetermined positions of the first post processing apparatus 120.

However, in a case where the process transits from step S305 to step S307, there is not any recording material that is planned to be discharged from the image forming apparatus 110 to the first post processing apparatus 120. Therefore, the image forming apparatus 110 inquires as to whether the recording materials that are being conveyed in the first post processing apparatus 120 can be stopped at the predetermined positions of the first post processing apparatus 120.

Thereafter, the image forming apparatus 110 determines whether the image forming apparatus 110 has received an inquiry result from the first post processing apparatus 120. Then, in a case where the image forming apparatus 110 has not received any inquiry result from the first post processing apparatus 120 (step S307: NO), the image forming apparatus 110 waits until an inquiry result is sent from the first post processing apparatus 120. On the other hand, in a case where the image forming apparatus 110 receives an inquiry result from the first post processing apparatus 120 (step S307: YES), the image forming apparatus 110 subsequently performs the process in step S308.

It should be noted that when the first post processing apparatus 120 receives an inquiry from the image forming apparatus 110, the first post processing apparatus 120 outputs the inquiry result thereof (stop possibility/impossibility notification process explained later). In a case where there is a recording material that cannot be stopped at the predetermined position in the first post processing apparatus, the first post processing apparatus 120 performs the same inquiry with the post processing apparatus at the further downstream side, the details of which will be explained later. For this reason, the inquiry result which the first post processing apparatus 120 outputs to the image forming apparatus 110 includes information indicating whether a recording material can be discharged and stopped at the post processing apparatus at the downstream with respect to the first post processing apparatus 120.

Therefore, in step S307, in a case where there is a recording material that cannot be stopped at the predetermined position in the image forming apparatus 110, the image forming apparatus 110 inquires as to whether there is any post processing apparatus in which the recording material can be stopped at the upstream side with respect to the post processing apparatus where a conveying abnormality occurs.

(Step S308)

The image forming apparatus 110 functions as the second determination unit 330, and determines whether the image forming apparatus 110 has received an inquiry result "stop is possible" in step S307.

In a case where the image forming apparatus 110 receives an inquiry result "stop is possible" in step S307 (step S308: YES), the image forming apparatus 110 subsequently performs the process in step S309. On the other hand, in a case where the image forming apparatus 110 receives an inquiry result "stop is impossible" in step S307 (step S308: NO), the image forming apparatus 110 subsequently performs the process in step S310.

(Step S309)

The image forming apparatus 110 functions as the second determination unit 330, and determines that all the recording materials that are being conveyed in the image forming system 100 can be stopped at the predetermined positions so as to allow the automatic purge later. In this case, the predetermined positions are defined so as to avoid the location that causes the deformation of the recording material (for example, image forming mechanism 116, first post processing mechanism 123) in the image forming system 100.

(Step S310)

The image forming apparatus 110 functions as the second determination unit 330, and determines that, in all the recording materials that are being conveyed in the image forming system 100, there is any recording material that cannot be stopped at the predetermined position so as to allow the automatic purge later.

Thereafter, the image forming apparatus 110 terminates the stop possibility/impossibility determination process, and proceeds to the process in step S204 of the print process explained above.

The stop possibility/impossibility determination process explained above is executed by the image forming apparatus 110, so that before the recording material that cannot be stopped at the predetermined position of the image forming apparatus 110 is discharged to the first post processing apparatus 120, a confirmation can be done to find if there is any space where the recording material can be stopped in the first post processing apparatus 120. Even when there is not any space where the recording material can be stopped in the first post processing apparatus 120, a confirmation can also be done to find if there is any space where the recording material can be stopped in the post processing apparatus at the further downstream.

(4) Stop Possibility/Impossibility Notification Process

Figure 12:
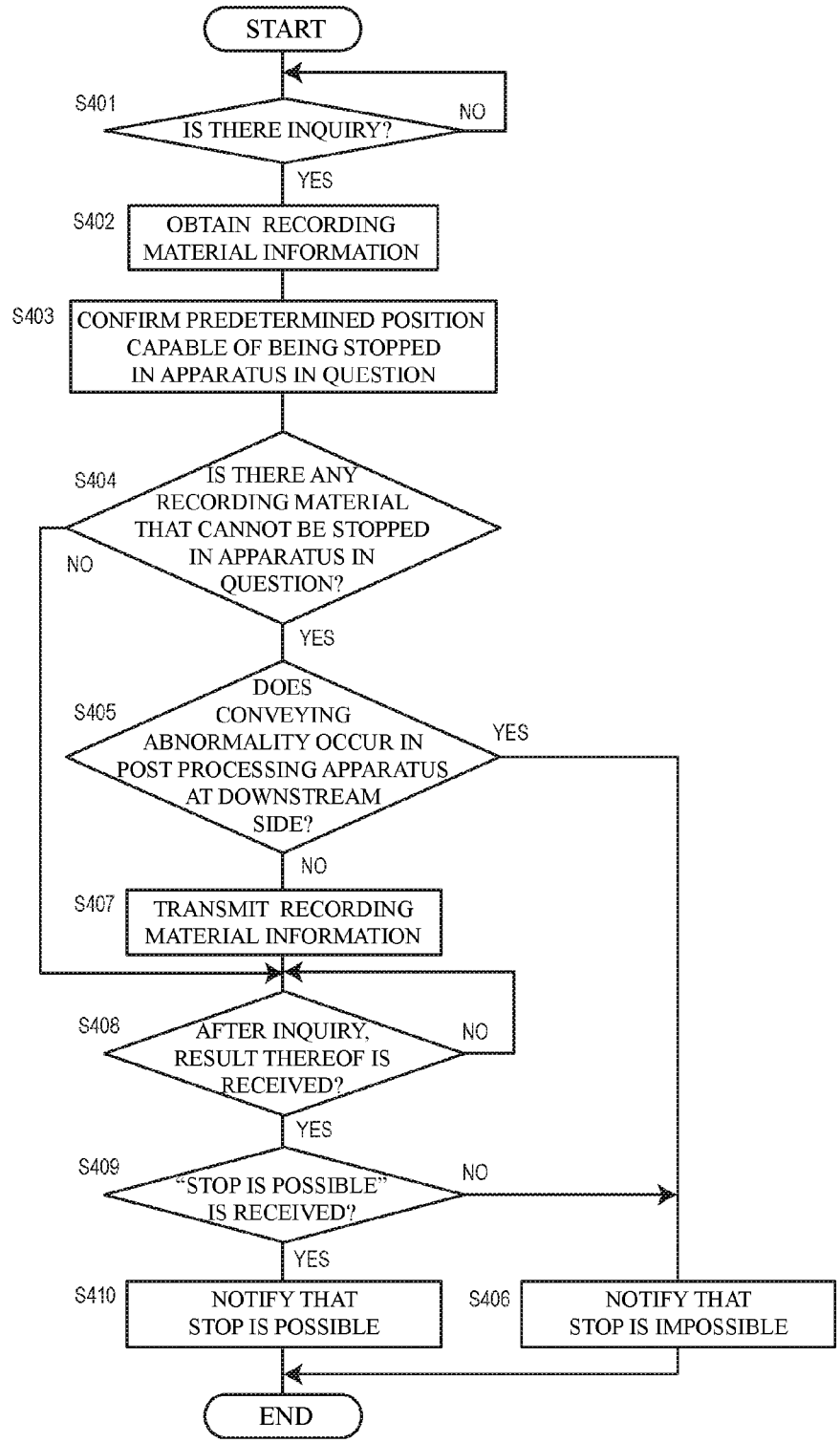
FIG. 12 is a flowchart illustrating a procedure of stop possibility/impossibility notification process executed by the post processing apparatus.

FIG. 12 is a flowchart illustrating a procedure of stop possibility/impossibility notification process executed by the post processing apparatus.

The post processing apparatus (for example, the first post processing apparatus 120 and the second post processing apparatus 130) at the upstream with respect to the post processing apparatus where a conveying abnormality occurs starts the stop possibility/impossibility notification process as shown in FIG. 12 with the timing when the power is turned on. However, the timing for starting the stop possibility/impossibility notification process is not limited thereto. Alternatively, when the image forming apparatus 110 starts the print process explained above, the stop possibility/impossibility notification process may be started.

It should be noted that the stop possibility/impossibility notification process executed by the post processing apparatuses 120, 130 are the same process, and therefore, in the following explanation, only the stop possibility/impossibility notification process executed by the first post processing apparatus 120 will be explained as a representing case.

(Step S401)

When the stop possibility/impossibility notification process is started, the first post processing apparatus 120 functions as the third determination unit 420, and determines whether there is any inquiry of step S307 from the image forming apparatus 110.

In a case where there is no inquiry from the image forming apparatus 110 (step S401: NO), the first post processing apparatus 120 waits until an inquiry is sent from the image forming apparatus 110. On the other hand, in a case where there is an inquiry from the image forming apparatus 110 (step S401: YES), the first post processing apparatus 120 subsequently performs the process in step S402. In a case where the first recording material information is transmitted from the image forming apparatus 110 in step S306 explained above, the image forming apparatus 110 receives the first recording material information and subsequently performs the process in step S402.

(Step S402)

The first post processing apparatus 120 functions as the third determination unit 420, and obtains the second recording material information about the recording materials that are being conveyed in the first post processing apparatus 120 (the apparatus in question).

For example, the first post processing apparatus 120 calculates, as an elapsed time of a recording material, a time from when each recording material sensor 124 provided on the conveying path in the first post processing apparatus 120 detects the front edge of a recording material at each position to when the recording material sensor 124 detects the rear edge thereof. Then, the first post processing apparatus 120 identifies the size of the recording material (A4, A3, and the like) that is being conveyed in the first post processing apparatus 120 in accordance with the calculated transit time of the recording material.

In addition, the first post processing apparatus 120 uses the recording material sensor 124 provided at the position (the entrance of the conveying path) where the recording material is conveyed from the image forming apparatus 110 (the apparatus of the preceding stage) to the first post processing apparatus 120 (the apparatus in question) to calculate the number of sheets of the recording materials C that have passed the position. At the same time, the first post processing apparatus 120 uses the recording material sensor 124 provided at the position (the exit of the conveying path) where the recording material is discharged from the first post processing apparatus 120 (the apparatus in question) to the second post processing apparatus 130 (the apparatus in the later-stage) to calculate the number of sheets of the recording materials D that have passed the position. Then, the first post processing apparatus 120 identifies the number of sheets of the recording materials that are being conveyed in the first post processing apparatus 120 by subtracting the number of sheets D from the number of sheets C.

The first post processing apparatus 120 saves the size of the recording material and the number of sheets identified as described above to a memory and the like as the second recording material information about the recording materials that are being conveyed in the first post processing apparatus 120. However, the method for identifying the size of the recording material and the number of sheets is not limited thereto.

(Step S403)

The first post processing apparatus 120 functions as the third determination unit 420, and confirms the predetermined positions in the first post processing apparatus 120 (the apparatus in question) that are defined so as to avoid the location that causes the deformation of the recording material. For example, the information indicating the predetermined position is stored to the storage and the like, and the first post processing apparatus 120 can confirm the predetermined position of the first post processing apparatus 120 by reading the information to the memory and the like.

In this case, the information indicating the predetermined position is different according to the size of the recording material that is being conveyed in the first post processing apparatus 120. For example, in a case where the size of the recording material identified in step S402 is "A4", the number of predetermined positions (P4, P5, P6) defined so as to avoid the surrounding portion of the first post processing mechanism 123 (which is three positions) is read as the information indicating the predetermined position as shown in FIG. 10. In a case where the size of the recording material identified in step S402 is "A3", the number of predetermined positions (P4, P5, P6) defined so as to avoid the surrounding portion of the first post processing mechanism 123 (which is three positions) is read as the information indicating the predetermined position as shown in FIG. 11.

(Step S404)

The first post processing apparatus 120 functions as the third determination unit 420, and determines whether there is any recording material that is being conveyed in the first post processing apparatus 120 and is planned to be discharged from the image forming apparatus 110 and that cannot be stopped at the predetermined position in the first post processing apparatus 120. In this case, the predetermined position is defined so as to avoid a location that causes the deformation of the recording material in the first post processing apparatus 120 (for example, the first post processing mechanism 123).

More specifically, the first post processing apparatus 120 identifies the number of sheets of the recording materials X that are determined not to be able to be stopped at the predetermined position in the image forming apparatus 110 on the basis of the first recording material information received in step S401. Further, the first post processing apparatus 120 identifies the number of sheets of the recording materials Y that are being conveyed in the first post processing apparatus 120 on the basis of the second recording material information obtained in step S402.

Therefore, the first post processing apparatus 120 adds the number of sheets X and the number of sheets Y which have been identified, and in a case where the summation of the number of sheets X and the number of sheets Y which have been identified is more than the number of predetermined positions Z confirmed in step 403 (X+Y>Z), the first post processing apparatus 120 determines whether there is any recording material that cannot be stopped at the predetermined position of the first post processing apparatus 120. On the other hand, in a case where the summation of the number of sheets X and the number of sheets Y which have been identified is equal to or more than the number of predetermined positions Z (X+Y≤Z), the first post processing apparatus 120 determines that all the recording materials can be stopped at the predetermined positions of the first post processing apparatus 120.

In a case where the first post processing apparatus 120 determines that there is a recording material that cannot be stopped at the predetermined position of the first post processing apparatus 120 (step S404: YES), the first post processing apparatus 120 subsequently performs the process in step S405. On the other hand, in a case where the first post processing apparatus 120 determines that all the recording materials can be stopped at the predetermined positions of the first post processing apparatus 120 (step S404: NO), the first post processing apparatus 120 subsequently performs the process in step S408.

(Step S405)

The first post processing apparatus 120 determines whether a conveying abnormality of a recording material occurs in the post processing apparatus at the immediate downstream (i.e., the second post processing apparatus 130). For example, in a case where a conveying abnormality is notified from the second post processing apparatus 130 in step S102 of the abnormality detection process, the first post processing apparatus 120 determines that a conveying abnormality occurs in the second post processing apparatus 130. On the other hand, in a case where any conveying abnormality is notified from the second post processing apparatus 130 in step S102 of the abnormality detection process, the first post processing apparatus 120 determines that any conveying abnormality does not occur in the second post processing apparatus 130.

In a case where the first post processing apparatus 120 determines that there is a conveying abnormality in the second post processing apparatus 130 (step S405: YES), the recording material in the first post processing apparatus 120 cannot be discharged to the post processing apparatus 130 at the downstream, and therefore, the first post processing apparatus 120 subsequently performs the process in step S406. On the other hand, in a case where the first post processing apparatus 120 determines that any conveying abnormality does not occur in the second post processing apparatus 130 (step S405: NO), the first post processing apparatus 120 subsequently performs the process in step S407.

(Step S406)

The first post processing apparatus 120 functions as the fourth determination unit 430, and notifies an inquiry result "stop is impossible" in response to the inquiry from the image forming apparatus 110 of step S307.

(Step S407)

The first post processing apparatus 120 functions as the fourth determination unit 430, and notifies the second recording material information about the recording material that is determined not to be able to be stopped at the predetermined position of the first post processing apparatus 120 in step S404 to the second post processing apparatus 130 which is at the downstream. For example, the first post processing apparatus 120 extracts the second recording material information about the recording materials that are determined not to be able to be stopped at the predetermined positions in the first post processing apparatus 120 from the second recording material information saved in the memory and the like in step S402, and transmits the second recording material information to the second post processing apparatus 130.

(Step S408)

The first post processing apparatus 120 functions as the fourth determination unit 430, and inquires as to whether the recording material that is determined not to be able to be stopped at the predetermined position of the first post processing apparatus 120 in step S404 can be stopped at the predetermined position in the second post processing apparatus 130. In this case, the predetermined position is defined so as to avoid a location that causes the deformation of the recording material in the second post processing apparatus 130.

In a case where there is already a recording material that is being conveyed in the second post processing apparatus 130, the first post processing apparatus 120 also takes the existence of the recording material into consideration. More specifically, the first post processing apparatus 120 inquires as to whether all the recording materials, which is the summation of the recording materials that are being conveyed in the second post processing apparatus 130 and the recording materials that are determined not to be able to be stopped at the predetermined positions of the first post processing apparatus 120, can be stopped at the predetermined positions of the second post processing apparatus 130.

However, in a case where the process transits from step S404 to step S408, there is not any recording material that is planned to be discharged from the first post processing apparatus 120 to the second post processing apparatus 130. Therefore, the first post processing apparatus 120 inquires as to whether the recording materials that are being conveyed in the second post processing apparatus 130 can be stopped at the predetermined positions of the second post processing apparatus 130.

Thereafter, the first post processing apparatus 120 determines whether the first post processing apparatus 120 has received an inquiry result from the second post processing apparatus 130. Then, in a case where the first post processing apparatus 120 has not received any inquiry result from the second post processing apparatus 130 (step S408: NO), the first post processing apparatus 120 waits until an inquiry result is sent from the second post processing apparatus 130. On the other hand, in a case where the first post processing apparatus 120 receives an inquiry result from the second post processing apparatus 130 (step S408: YES), the first post processing apparatus 120 subsequently performs the process in step S409.

It should be noted that when the second post processing apparatus 130 receives an inquiry from the first post processing apparatus 120, the second post processing apparatus 130 outputs the inquiry result thereof (stop possibility/impossibility notification process in a case of execution with the second post processing apparatus 130). More specifically, in a case where there is a recording material that cannot be stopped at the predetermined position in the second post processing apparatus 130 (step S404: YES), the second post processing apparatus 130 performs the same inquiry with the post processing apparatus at the further downstream side (step S408). However, in a case where a conveying abnormality occurs in the post processing apparatus at the further downstream side (step S405: YES), the inquiry is not performed, and an inquiry result "stop is impossible" is notified to the first post processing apparatus 120 (step S406).

(Step S409)

The first post processing apparatus 120 functions as the fourth determination unit 430, and determines whether an inquiry result "stop is possible" is received or not in step S408.

In a case where the first post processing apparatus 120 receives an inquiry result "stop is possible" in step S408 (step S409: YES), the first post processing apparatus 120 subsequently performs the process in step S410. On the other hand, in a case where the first post processing apparatus 120 receives an inquiry result "stop is impossible" from the second post processing apparatus 130 in step S408 (step S409: NO), the first post processing apparatus 120 subsequently performs the process in step S406. At this occasion, the first post processing apparatus 120 notifies an inquiry result "stop is impossible" to the image forming apparatus 110.

(Step S410)

The first post processing apparatus 120 functions as the fourth determination unit 430, and notifies an inquiry result "stop is possible" in response to the inquiry from the image forming apparatus 110 of step S307.

Thereafter, the first post processing apparatus 120 terminates the stop possibility/impossibility notification process.

However, in a case where the second post processing apparatus 130 executes the stop possibility/impossibility notification process explained above, the "image forming apparatus 110" is read as the "first post processing apparatus 120" in each step. The "first post processing apparatus 120" is read as the "second post processing apparatus 130". The "second post processing apparatus 130" is read as the "third post processing apparatus 140". The "third determination unit 420" is read as the "fifth determination unit 520". The "fourth determination unit 430" is read as the "sixth determination unit 530".

The stop possibility/impossibility notification process explained above is executed by the first post processing apparatus 120, so that an inquiry result "stop is possible" or "stop is impossible" can be notified in response to an inquiry from the image forming apparatus 110 at the upstream side. The stop possibility/impossibility notification process explained above is executed by the second post processing apparatus 130, so that an inquiry result "stop is possible" or "stop is impossible" can be notified in response to an inquiry from the first post processing apparatus 120 explained above.

(5) Retraction Control Process S206

Figure 13:
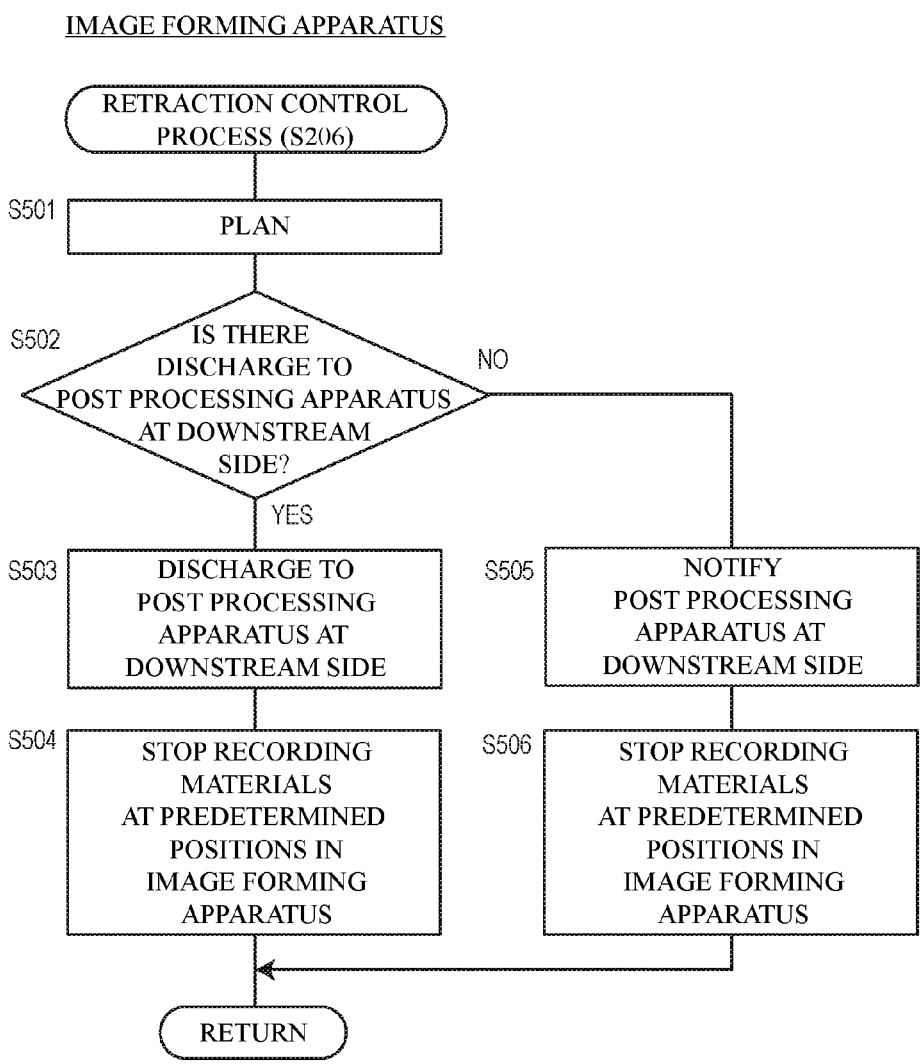
FIG. 13 is a flowchart illustrating a procedure of retraction control process executed by the image forming apparatus.

FIG. 13 is a flowchart illustrating a procedure of retraction control process executed by the image forming apparatus.

As described above, when the process proceeds to the print process in step S206, the image forming apparatus 110 starts the retraction control process as shown in FIG. 13.

(Step 501)

When the retraction control process is started, the image forming apparatus 110 functions as the stop control unit 340, and makes a plan as to which position of which apparatus the recording material that is being conveyed in the image forming system 100 is stopped on the basis of the determination result of the stop possibility/impossibility determination process S203 explained above.

For example, a case where there are recording materials (however, A4 size), which are being conveyed, at the positions (P1 to P9) as shown in FIG. 6 when a conveying abnormality occurs will be considered. If there are only three predetermined positions defined so as to avoid the surrounding portion of the image forming mechanism 116 in the image forming apparatus 110, the image forming apparatus 110 plans to discharge two of five A4 size recording materials to the post processing apparatuses 120, 130 at the downstream side.

At this occasion, the image forming apparatus 110 determines whether totally four recording materials, which include two recording materials that are being conveyed in the first post processing apparatus 120 and two recording materials that are planned to be conveyed from the image forming apparatus 110, can be stopped in the first post processing apparatus 120. If there are only three predetermined positions defined so as to avoid the surrounding portion of the first post processing mechanism 123 in the first post processing apparatus 120, the image forming apparatus 110 plans to discharge one of the four recording materials from the first post processing apparatus 120 to the second post processing apparatus 130.

Then, the image forming apparatus 110 plans to stop totally two recording materials, which include a recording material that is being conveyed in the second post processing apparatus 130 and a recording material that is planned to be conveyed from the first post processing apparatus 120, at the predetermined positions of the second post processing apparatus 130.

As another example, a case where there is recording materials (however, A3 size), which are being conveyed, at the positions (P1 to P8) as shown in FIG. 7 when a conveying abnormality occurs will be considered. If there are only two predetermined positions defined so as to avoid the surrounding portion of the image forming mechanism 116 in the image forming apparatus 110, the image forming apparatus 110 plans to discharge two of four A3 size recording materials to the post processing apparatuses 120, 130 at the downstream side.

At this occasion, the image forming apparatus 110 determines whether totally four recording materials, which include two recording materials that are being conveyed in the first post processing apparatus 120 and two recording materials that are planned to be conveyed from the image forming apparatus 110, can be stopped in the first post processing apparatus 120. If there are only three predetermined positions defined so as to avoid the surrounding portion of the first post processing mechanism 123 in the first post processing apparatus 120, the image forming apparatus 110 plans to discharge one of four recording materials from the first post processing apparatus 120 to the second post processing apparatus 130.

Then, the image forming apparatus 110 plans to stop totally two recording materials, which include a recording material that is being conveyed in the second post processing apparatus 130 and a recording material that is planned to be conveyed from the first post processing apparatus 120, at the predetermined positions of the second post processing apparatus 130.

Thereafter, the image forming apparatus 110 saves the planned content as planned data to the memory and the like.

(Step S502)

The image forming apparatus 110 functions as the stop control unit 340, and determines whether it is necessary to discharge the recording material to the first post processing apparatus 120 at the downstream side on the basis of the plan of step S501. For example, the image forming apparatus 110 reads the plan data stored in the memory and the like in step S501, and identifies the number of sheets of the recording materials planned to be conveyed from the image forming apparatus 110 to the first post processing apparatus 120. In any of the examples as shown in FIGS. 6, 7, two recording materials are planned to be discharged to the first post processing apparatus 120, and therefore, the image forming apparatus 110 determines that it is necessary to discharge the recording materials to the first post processing apparatus 120.

In a case where the image forming apparatus 110 determines that it is necessary to discharge the recording materials to the first post processing apparatus 120 (step S502: YES), the image forming apparatus 110 subsequently performs the process in step S503. On the other hand, in a case where the image forming apparatus 110 determines that it is not necessary to discharge the recording materials to the first post processing apparatus 120 (step S502: NO), the image forming apparatus 110 subsequently performs the process in step S505.

(Step S503)

The image forming apparatus 110 functions as the stop control unit 340, and controls the conveying mechanism 115 and the like to discharge the recording material that are determined not to need to be discharged in step S502 to the first post processing apparatus 120 at the downstream side. For example, in any of the examples as shown in FIGS. 6, 7, the recording materials at the positions P5, P6 are discharged to the first post processing apparatus 120. The positions of the discharged recording materials are shown in FIGS. 10, 11.

It should be noted that, together with the discharge of the recording materials, the image forming apparatus 110 notifies the content planned in step S501 to the first post processing apparatus 120. More specifically, the image forming apparatus 110 transmits the plan data stored in the memory and the like in step S501 to the first post processing apparatus 120 via the later-stage I/F 118.

(Step S504)

The image forming apparatus 110 functions as the stop control unit 340, and controls the conveying mechanism 115 and the like to convey the recording materials other than the recording materials that are determined not to need to be discharged in step S502 to the predetermined positions in the image forming apparatus 110. For example, in the example of FIG. 10, the recording materials at the positions P7, P8, P9 are conveyed to and stopped at the predetermined positions defined so as to avoid the surrounding portion of the image forming mechanism 116. In the example as shown in FIG. 11, the recording materials at the positions of P7, P8 are conveyed to and stopped at the predetermined positions defined so as to avoid the surrounding portion of the image forming mechanism 116.

(Step S505)

The image forming apparatus 110 functions as the stop control unit 340, and notifies the content planned in step S501 to the first post processing apparatus 120. More specifically, the image forming apparatus 110 transmits the plan data stored in the memory and the like in step S501 to the first post processing apparatus 120 via the later-stage I/F 118.

(Step S506)

The image forming apparatus 110 functions as the stop control unit 340, and controls the conveying mechanism 115 and the like to convey all the recording materials in the image forming apparatus 110 to the predetermined positions in the image forming apparatus 110 and stop all the recording materials in the image forming apparatus 110 at the predetermined positions in the image forming apparatus 110.

Thereafter, the image forming apparatus 110 terminates the retraction control process.

The retraction control process explained above is executed by the image forming apparatus 110, so that the recording materials that are determined not to be able to be stopped at the predetermined positions in the image forming apparatus 110 are discharged to the first post processing apparatus 120. The recording materials remaining in the image forming apparatus 110 are conveyed to and stopped at the predetermined positions in the image forming apparatus 110.

(6) Retraction Process

Figure 14:
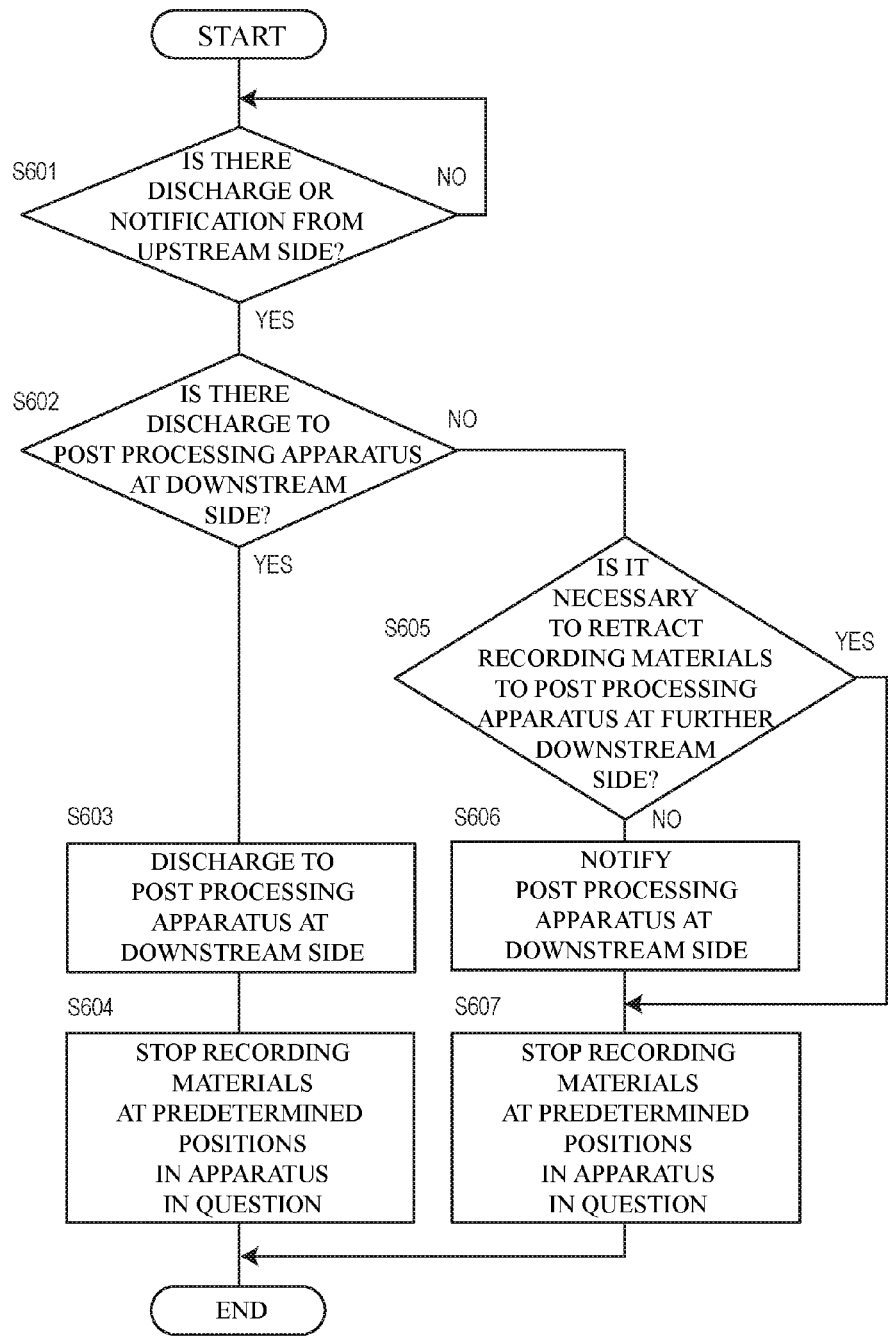
FIG. 14 is a flowchart illustrating a procedure of retraction process executed by the post processing apparatus.

FIG. 14 is a flowchart illustrating a procedure of retraction process executed by the post processing apparatus.

Each of the post processing apparatuses at the upstream side with respect to the post processing apparatus where a conveying abnormality occurs (for example, the first post processing apparatus 120 and the second post processing apparatus 130) starts the retraction process as shown in FIG. 14 with the timing when the power is turned on. However, the timing for starting the retraction process is not limited thereto. Alternatively, the retraction process may be started when the image forming apparatus 110 starts the print process explained above or when a conveying abnormality is detected.

It should be noted that the retraction process executed by the post processing apparatuses 120, 130 are the same process, and therefore, in the following explanation, only the retraction process executed by the first post processing apparatus 120 will be explained as a representing case.

(Step S601)

When the retraction process is started, the first post processing apparatus 120 functions as the stop control unit 440, and determines whether it is necessary to discharge the recording materials from the upstream (for example, the image forming apparatus 110) or there is a notification of a plan content of retraction.

For example, in a case where any recording material is not discharged from the image forming apparatus 110 and there is not any notification of a plan content of retraction (step S601: NO), the first post processing apparatus 120 waits. On the other hand, in a case where the recording materials are discharged from the image forming apparatus 110 by the process in step S503 explained above and a notification of plan data is received (step S601: YES), the first post processing apparatus 120 subsequently performs the process in step S602. Even in a case where plan data transmitted from the image forming apparatus 110 by the process in step S505 explained above is received (step S601: YES), the first post processing apparatus 120 subsequently performs the process in step S602.

(Step S602)

The first post processing apparatus 120 functions as the stop control unit 440, and determines whether it is necessary to discharge the recording materials to the post processing apparatus at the further downstream side (the second post processing apparatus 130) on the basis of the plan data received in step S601. For example, the first post processing apparatus 120 refers to the plan data received in step S601, and identifies the number of sheets of the recording materials planned to be conveyed from the first post processing apparatus 120 to the second post processing apparatus 130. In any of the examples as shown in FIGS. 6, 7, a single recording material is planned to be discharged to the second post processing apparatus 130, and therefore, the first post processing apparatus 120 determines that it is necessary to discharge the recording materials to the second post processing apparatus 130.

In a case where the first post processing apparatus 120 determines that it is necessary to discharge the recording materials to the second post processing apparatus 130 (step S602: YES), the first post processing apparatus 120 subsequently performs the processing in step S603. On the other hand, in a case where the first post processing apparatus 120 determines that it is not necessary to discharge the recording materials to the second post processing apparatus 130 (step S602: NO), the first post processing apparatus 120 subsequently performs the process in step S605.

(Step S603)

The first post processing apparatus 120 functions as the stop control unit 440, and controls the conveying mechanism 122 and the like to discharge the recording materials that are determined to need to be discharged in step S602 to the second post processing apparatus 130 at the downstream side. For example, in any of the examples as shown in FIGS. 6, 7, the recording material at the position of P3 is discharged to the second post processing apparatus 130. The position of the discharged recording material is shown in FIGS. 10, 11.

It should be noted that, together with the discharge of the recording materials, the first post processing apparatus 120 notifies, to the second post processing apparatus 130, the plan content of retraction notified from the image forming apparatus 110 in step S601. More specifically, the first post processing apparatus 120 transmits the plan data received in step S601 to the second post processing apparatus 130 via the later-stage I/F 126.

(Step S604)

The first post processing apparatus 120 functions as the stop control unit 440, and controls the conveying mechanism 122 and the like to convey the recording materials other than the recording materials determined to need to be discharged in step S602 to the predetermined positions of the first post processing apparatus 120 and stop the recording materials other than the recording materials determined to need to be discharged in step S602. For example, in the example as shown in FIGS. 10, 11, the recording materials at the positions of P4, P5, P6 are conveyed to and stopped at the predetermined position determined so as to avoid the surrounding portion of the first post processing mechanism 123.

(Step S605)

The first post processing apparatus 120 functions as the stop control unit 440, and determines whether it is necessary to perform the retraction process in the post processing apparatus at the further downstream side (second post processing apparatus 130) on the basis of the plan data received in step S601. For example, in a case where a conveying abnormality of a recording material occurs in the second post processing apparatus 130, or in a case where the recording materials in the second post processing apparatus 130 are already stopped at the predetermined positions, then the first post processing apparatus 120 determines that it is not necessary to perform the retraction process in the second post processing apparatus 130. On the other hand, in a case where any conveying abnormality of a recording material does not occur in the second post processing apparatus 130, and it is necessary to convey the recording materials in the second post processing apparatus 130 to the predetermined positions, then the first post processing apparatus 120 determines that the retraction process is needed in the second post processing apparatus 130.

In a case where the retraction process is determined to be needed in the second post processing apparatus 130 (step S605: YES), the first post processing apparatus 120 subsequently performs the process in step S606. On the other hand, in a case where the retraction process is determined not to be needed in the second post processing apparatus 130 (step S605: NO), the first post processing apparatus 120 subsequently performs the process in step S607.

(Step S606)

The first post processing apparatus 120 functions as the stop control unit 440, and notifies the plan content of the retraction notified from the image forming apparatus 110 in step S601 to the second post processing apparatus 130. More specifically, the first post processing apparatus 120 transmits the plan data received in step S601 via the later-stage I/F 126 to the second post processing apparatus 130.

(Step S607)

The first post processing apparatus 120 functions as the stop control unit 440, and controls the conveying mechanism 122 and the like to convey all the recording materials in the first post processing apparatus 120 to the predetermined positions of the first post processing apparatus 120.

Thereafter, the first post processing apparatus 120 terminates the retraction process.

However, in a case where the second post processing apparatus 130 executes the retraction process explained above, the "image forming apparatus 110" is read as the "first post processing apparatus 120" in each step. The "first post processing apparatus 120" is read as the "second post processing apparatus 130". The "second post processing apparatus 130" is read as the "third post processing apparatus 140". The "stop control unit 440" is read as the "stop control unit 540". The "later-stage I/F 126" is read as the "later-stage I/F 136".

The retraction process explained above is executed by the first post processing apparatus 120, so that the recording materials that are determined not to be able to be stopped at the predetermined positions of the first post processing apparatus 120 are discharged to the second post processing apparatus 130. The recording materials remaining in the first post processing apparatus 120 are conveyed to and stopped at the predetermined positions of the first post processing apparatus 120. The retraction process explained above is likewise executed by the second post processing apparatus 130, so that the recording materials in the second post processing apparatus 130 are conveyed to and stopped at the predetermined positions in the second post processing apparatus 130.

The retraction control process and the retraction process explained above are executed, so that all the recording materials that are being conveyed in an apparatus at the upstream side with respect to the post processing apparatus where a conveying abnormality occurs can be stopped at the predetermined positions in the image forming system 100.

Each of the processing units in each flowchart explained above is divided in accordance with the main processing content for the sake of easy understanding of the image forming system 100. The invention of the present application is not limited by the way the processing steps are divided and the names thereof. The process performed by the image forming system 100 can be divided into more processing steps. Alternatively, furthermore processing steps may be included in a single processing step.
<Modification>
The embodiment explained above is intended to show an example of a gist of the present invention, and does not limit the present invention. Many substitutions, changes, and modifications are clear to a person skilled in the art.
(1) First Modification
For example, in the above embodiment, an example where three post processing apparatuses (the post processing apparatuses 120 to 140) are connected at the downstream side of the single image forming apparatus 110 has been explained. However, the present invention is not limited thereto. For example, at the downstream side of the image forming apparatus 110, only two post processing apparatuses may be connected or four or more post processing apparatuses may be connected.

For example, a modification where two post processing apparatuses 120, 130 are connected at the downstream side of the image forming apparatus 110 will be explained briefly.

Figure 15:
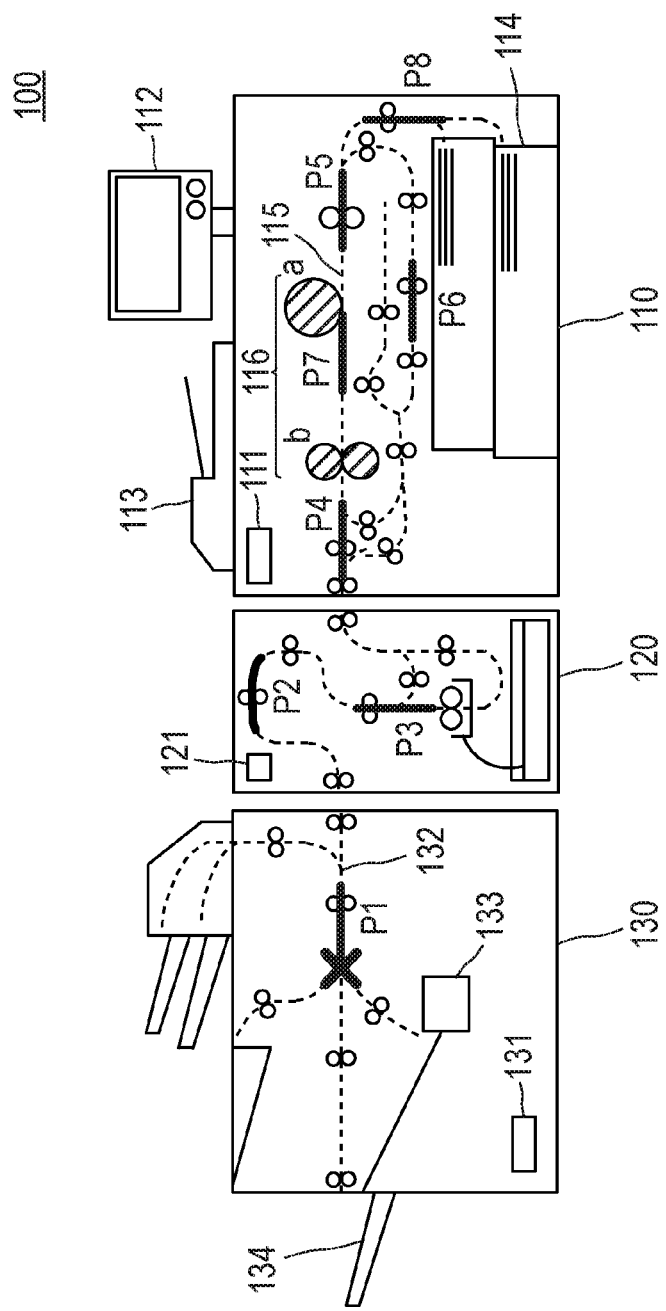
FIG. 15 is a figure illustrating an example 1 of positions of recording materials (A4 size) when a conveying abnormality occurs in an image forming system according to a modification.
Figure 16:
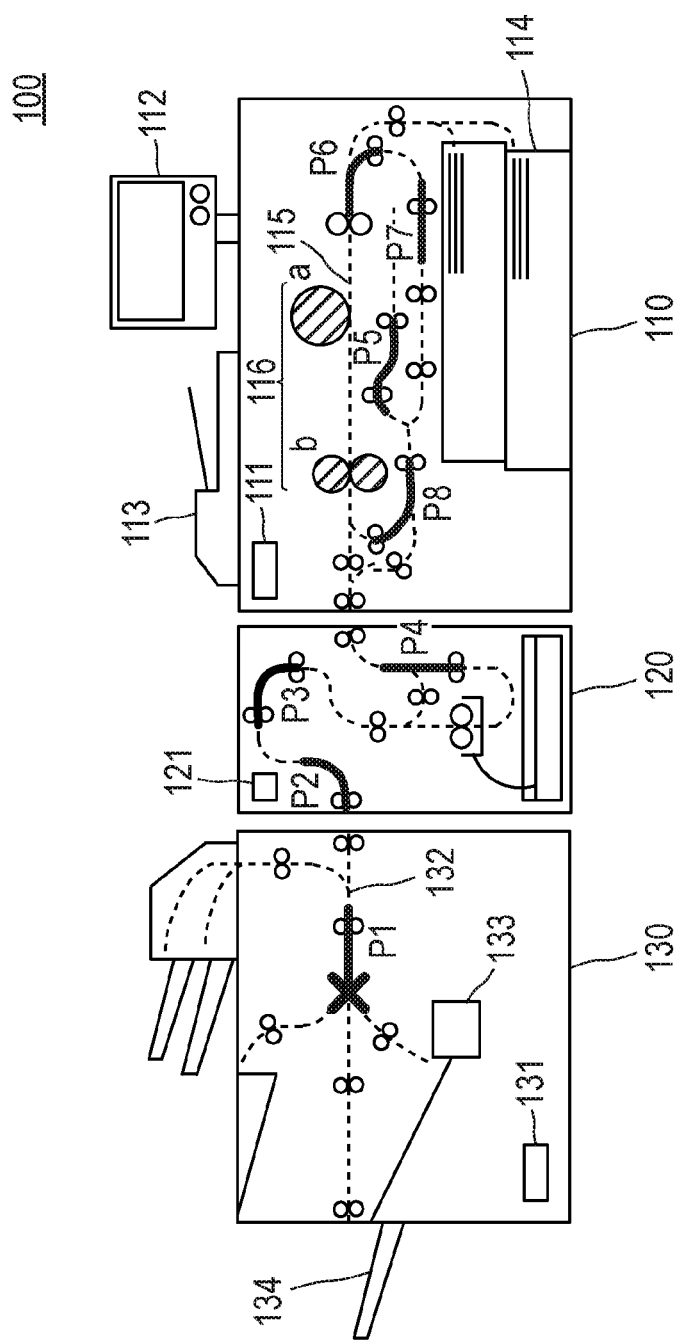
FIG. 16 is a figure illustrating an example 1 of predetermined positions for stopping recording materials (A4 size) in the image forming system according to the modification.

FIG. 15 is a figure illustrating an example 1 of positions of recording materials (A4 size) when a conveying abnormality occurs in an image forming system according to a modification. FIG. 16 is a figure illustrating an example 1 of predetermined positions for stopping recording materials (A4 size) in the image forming system according to the modification.

For example, a case will be considered in which there are recording materials (however, A4 size), which are being conveyed, at the positions (P1 to P8) as shown in FIG. 15, when a conveying abnormality occurs in the second post processing apparatus 130 in the image forming system 100 according to the modification. If there are only four predetermined positions defined so as to avoid the surrounding portion of the image forming mechanism 116 in the image forming apparatus 110, the image forming apparatus 110 discharges one of five A4 size recording materials to the post processing apparatus 120 at the downstream side.

At this occasion, the image forming apparatus 110 determines whether totally three recording materials, which include two recording materials that are being conveyed in the first post processing apparatus 120 and one recording material that is planned to be conveyed from the image forming apparatus 110, can be stopped in the first post processing apparatus 120. If there are only three predetermined positions defined so as to avoid the surrounding portion of the first post processing mechanism 123 in the first post processing apparatus 120, the first post processing apparatus 120 conveys all of the three recording materials to the predetermined positions of the first post processing apparatus 120 and stops all of the three recording materials. The positions of the stopped recording materials are shown in FIG. 16.

Figure 17:
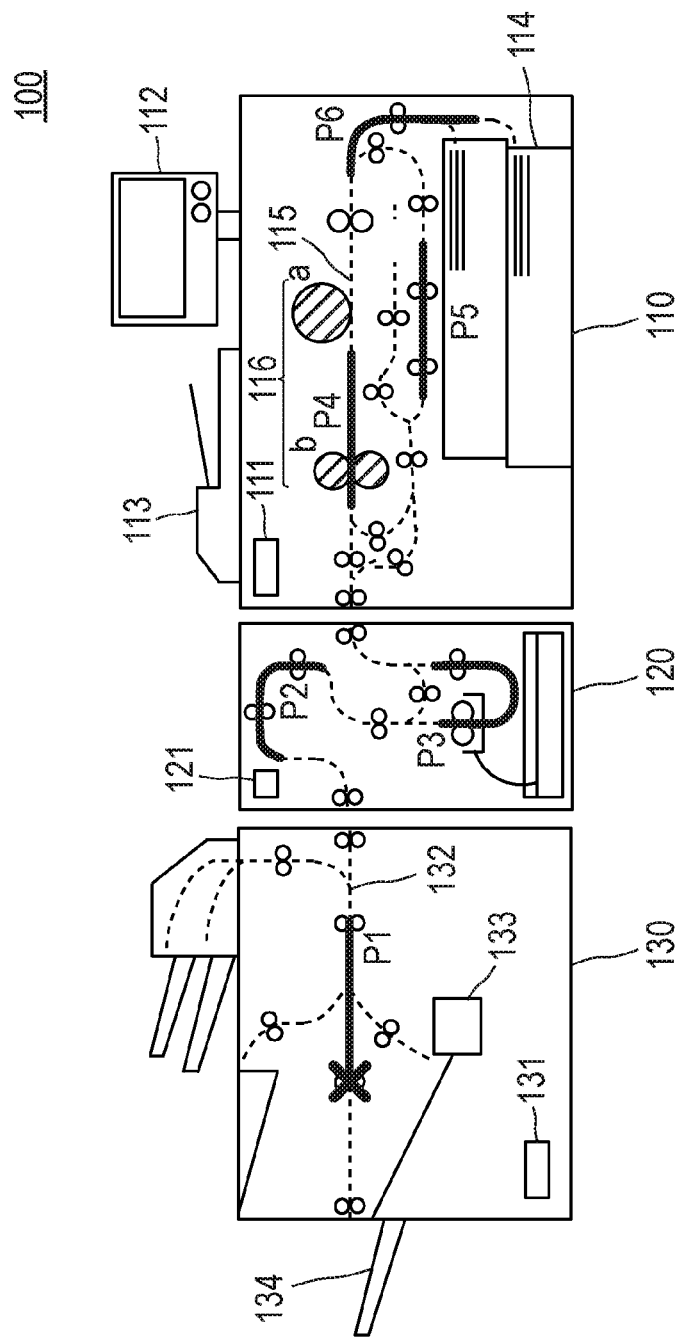
FIG. 17 is a figure illustrating an example 2 of positions of recording materials (A3 size) when a conveying abnormality occurs in the image forming system according to the modification.
Figure 18:
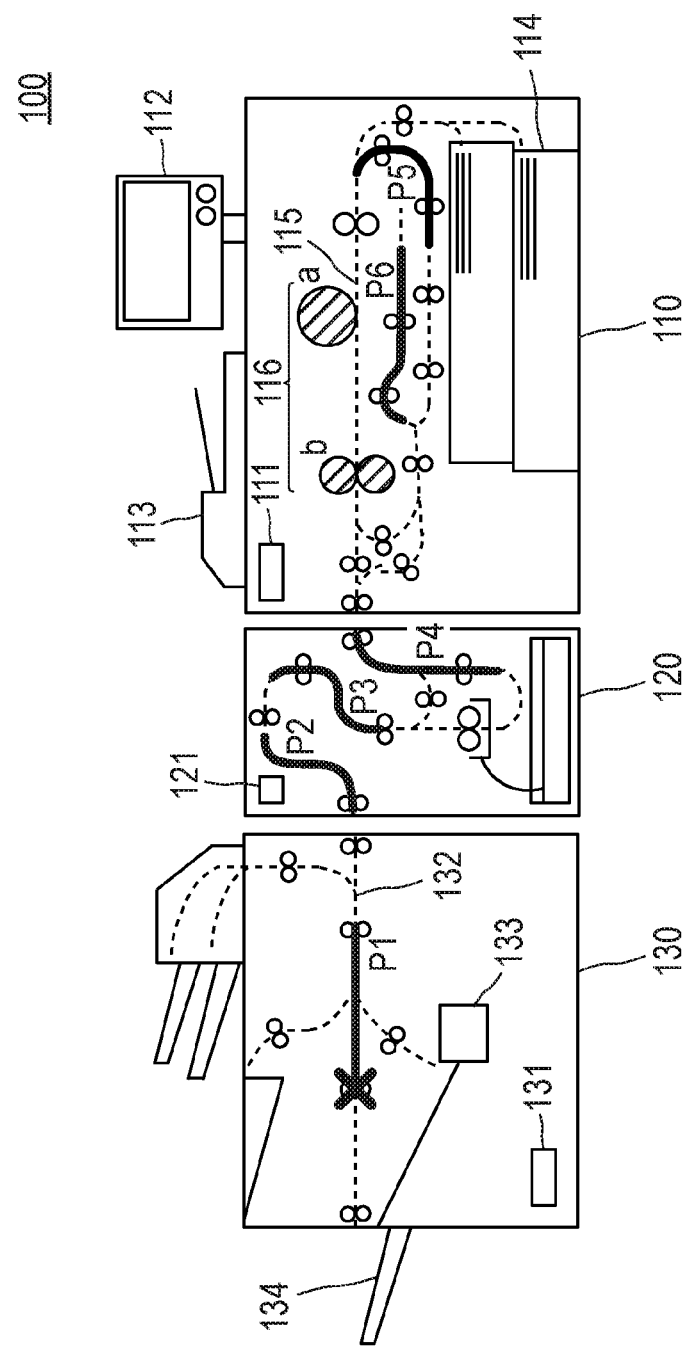
FIG. 18 is a figure illustrating an example 2 of predetermined positions for stopping recording materials (A3 size) in the image forming system according to the modification.

In the image forming system according to the modification, the predetermined positions defined so as to avoid the location that causes the deformation of the recording material are caused to be different in accordance with the size of the recording material that is being conveyed. FIG. 17 is a figure illustrating an example 2 of positions of recording materials (A3 size) when a conveying abnormality occurs in the image forming system according to the modification. FIG. 18 is a figure illustrating an example 2 of predetermined positions for stopping recording materials (A3 size) in the image forming system according to the modification.

For example, a case will be considered in which there are recording materials (however, A3 size), which are being conveyed, at the positions (P1 to P6) as shown in FIG. 17, when a conveying abnormality occurs in the second post processing apparatus 130 in the image forming system 100 according to the modification. If there are only two predetermined positions defined so as to avoid the surrounding portion of the image forming mechanism 116 in the image forming apparatus 110, the image forming apparatus 110 discharges one of three A3 size recording materials to the post processing apparatus 120 at the downstream side.

At this occasion, the image forming apparatus 110 determines whether totally three recording materials, which include two recording materials that are being conveyed in the first post processing apparatus 120 and one recording material that is planned to be conveyed from the image forming apparatus 110, can be stopped in the first post processing apparatus 120. If there are only three predetermined positions defined so as to avoid the surrounding portion of the first post processing mechanism 123 in the first post processing apparatus 120, the first post processing apparatus 120 conveys all of the three recording materials to the predetermined positions of the first post processing apparatus 120 and stops all of the three recording materials. The positions of the stopped recording materials are shown in FIG. 18.

As described above, in a case where only two post processing apparatuses 120 are connected to the downstream side of the image forming apparatus 110, the recording material that cannot be stopped at the predetermined position in the image forming apparatus 110 can be discharged to the post processing apparatus at the downstream side. In addition, all the recording materials that are being conveyed in the apparatus at the upstream side with respect to the post processing apparatus where a conveying abnormality occurs can be stopped at the predetermined positions in the image forming system 100.

(2) Second Modification
In the above embodiment, the first post processing apparatus 120 having the humidification function, the second post processing apparatus 130 having the duplex conveying function, and the third post processing apparatus 140 having the side-stick binding function are connected continuously at the downstream side of the image forming apparatus 110. However, the present invention is not limited thereto. The function possessed by each post processing apparatus, the order of connection of the post processing apparatuses, and the like may be changed flexibly as necessary.

(3) Third Modification
In the above embodiment, the predetermined positions defined to avoid the location that causes the deformation of the recording material is changed in accordance with the size of the recording material. However, the present invention is not limited thereto, and the predetermined position thereof may be changed in accordance with the quality of a recording material (the thickness, the type of the sheet, and the like) and in accordance with the purpose.

(4) Fourth Modification
In the above embodiment, the image forming mechanism 116 generating heat and the first post processing mechanism 123 humidifying are shown as examples of locations that cause the deformation of the recording material. However, the present invention is not limited thereto as long as the locations are locations that cause deformation of the recording material (including smear and the like). For example, when a recording material is stopped while the recording material is on multiple different conveying rollers, wrinkles may be generated on the recording material when the conveying is resumed, because of differences in the rotation speed, the torque, and the like of the conveying rollers.

Therefore, a position where a recording material is on multiple different conveying rollers may be added to examples of locations that cause the deformation of the recording materials. In other words, the predetermined positions where the recording materials are stopped include "a position where a recording material is not on multiple different conveying rollers".

(5) Fifth Modification

In step S305 of the above embodiment, the image forming apparatus 110 determines whether the recording materials that are being conveyed in the image forming apparatus 110 include any recording material that cannot be stopped at the predetermined position in the image forming apparatus 110 or not. The determination at this occasion is made by causing the image forming apparatus 110 to compare the number of sheets of the recording materials that are being conveyed in the image forming apparatus 110 and the number of predetermined positions in the image forming apparatus 110

However, the present invention is not limited thereto. For example, image forming apparatus 110 may make the determination by comparing the entire length of the number of predetermined positions designated as the predetermined positions in the image forming apparatus 110 and "the length in the conveying direction*the number of sheets" of the recording materials that are being conveyed in the image forming apparatus 110. However, "*" denotes multiplication.

For example, in a case where "the length in the conveying direction*the number of sheets" of the recording materials that are being conveyed in the image forming apparatus 110 is determined to be longer than the entire length of the conveying path of the predetermined positions in the image forming apparatus 110, the image forming apparatus 110 determines that there is a recording material that cannot be stopped in the image forming apparatus 110. On the other hand, in a case where "the length in the conveying direction*the number of sheets" of the recording materials that are being conveyed in the image forming apparatus 110 is determined to be equal to or less than the entire length of the conveying path designated as the predetermined positions in the image forming apparatus 110, the image forming apparatus 110 determines that all the recording materials can be stopped in the image forming apparatus 110.

In the fifth modification, the recording material information (the first and the second recording material information) includes the length in the conveying direction and the number of sheets of the recording materials.

Then, in step S404, the first post processing apparatus 120 determines whether there is any recording material that cannot be stopped at the predetermined position of the first post processing apparatus 120 on the basis of the first recording material information including the length in the conveying direction and the number of sheets of the recording materials. For example, the first post processing apparatus 120 refers to the first recording material information to calculate "the length in the conveying direction*the number of sheets" of the recording materials that are determined not to be able to be stopped at the predetermined positions in the image forming apparatus 110. Further, the first post processing apparatus 120 calculates "the length in the conveying direction*the number of sheets" of the recording materials that are being conveyed in the first post processing apparatus 120 on the basis of the second recording material information obtained in step S402. In this case, "the length in the conveying direction*the number of sheets" of the recording materials that are determined not to be able to be stopped at the predetermined positions in the image forming apparatus 110 is denoted as X', and "the length in the conveying direction*the number of sheets" of the recording materials that are being conveyed in the first post processing apparatus 120 is denoted as Y'. Thereafter, the first post processing apparatus 120 adds X' and Y' that have been calculated, and in a case where the summation of X' and Y' is more than the entire length of the conveying path Z' designated as the predetermined position of the first post processing apparatus 120 (X'+Y'>Z'), the first post processing apparatus 120 determines that there is a recording material that cannot be stopped at the predetermined position of the first post processing apparatus 120. On the other hand, in a case where the summation of X' and Y' that have been calculated is determined to be equal to or less than the entire length Z' (X'+Y'≤Z'), the first post processing apparatus 120 determines that all the recording materials can be stopped at the predetermined positions of the first post processing apparatus 120.

According to the processing that has been explained above, the length in the conveying direction and the number of sheets of the recording materials are used to determine whether the recording materials that are being conveyed in the apparatus in question (including the recording materials that are planned to be conveyed from the apparatus at the upstream side) can be stopped at the predetermined positions of the apparatus in question.

(6) Sixth Modification

In the fifth modification, the recording material information (the first and the second recording material information) includes the length in the conveying direction and the number of sheets of the recording materials, and the post processing apparatus having received the recording material information calculates "the length in the conveying direction*the number of sheets" of the recording materials. However, the embodiments are not limited thereto. Alternatively, the apparatus transmitting the recording material information may calculate "the length in the conveying direction*the number of sheets" of the recording materials, and may transmit the calculated information to the post processing apparatus at the downstream side in such a manner that the calculated information is included in the recording material information (the first and the second recording material information). It should be noted that "the length in the conveying direction*the number of sheets" corresponds to the entire length where all the recording materials of the calculation target is arranged in the conveying direction without any space therebetween.

(7) Seventh Modification

In the above embodiment, each of the image forming apparatus 110, the first post processing apparatus 120, and the second post processing apparatus 130 includes first and second determination units 320, 330, third and fourth determination units 420, 430, and fifth, sixth determination units 520, 530. However, the present invention is not limited thereto. The process by all of the first to the sixth determination units may be caused to be executed by a single apparatus (for example, the image forming apparatus 110).

In the configuration of the image forming system 100 explained above, the main elements have been explained to explain the features of the embodiments and the modifications, and the present invention is not limited to the above configuration. It is to be understood that the configuration provided in a generally-available image forming system 100 is not excluded.

Each functional configuration of the image forming system 100 is classified in accordance with main processing contents or the sake of easy understanding of the functional configurations. The invention of the present application is not limited by the way the constituent elements are divided and the names thereof. Each functional configuration can be further divided into more constituent elements in accordance with the processing content. Alternatively, a single constituent element may execute further more processes.

The process of each functional configuration of the image forming system 100 explained above may also be executed by a dedicated hardware circuit. In this case, the process of each functional configuration of the image forming system 100 explained above may be executed by a single hardware, or may be executed multiple pieces of hardware.

A program for operating the image forming system 100 may be provided by a non-transitory computer readable recording medium such as a USB memory, a flexible disk, and a CD-ROM, or may be provided online via a network such as the Internet. In this case, the program recorded on the non-transitory computer readable recording medium is usually transferred to and stored in a memory, a storage, and the like. This program may be provided, for example, as independent application software, or may be incorporated into software of each apparatus as a function of the image forming system 100.

What is claimed is:

1. An image forming system including an image forming apparatus and a plurality of post processing apparatus, the image forming system comprising:
    an abnormality detection unit configured to detect a conveying abnormality of a recording material in a conveying path of the plurality of post processing apparatuses;
    a first determination unit, wherein in a case where the abnormality detection unit detects the conveying abnormality of the recording material, the first determination unit determines, based on an amount of recording material in at least a portion of the conveying path, whether there is any recording material that is being conveyed in the image forming apparatus and that the image forming apparatus is unable to stop at a predetermined position, said predetermined position being a position which avoids a location that causes a deformation of the recording material;
    a second determination unit, wherein in a case where the first determination unit determines that there is a recording material that the image forming apparatus is unable to stop at the predetermined position in the image forming apparatus, the second determination unit determines whether there is any post processing apparatus in which the recording material can be stopped at an upstream side with respect to the post processing apparatus where the conveying abnormality occurs; and
    a stop control unit, wherein in a case where the second determination unit determines that there is a post processing apparatus in which the recording material can be stopped, the stop control unit discharges the recording material that the image forming apparatus is unable to stop at the predetermined position in the image forming apparatus to a post processing apparatus at a downstream side with respect to the image forming apparatus and stops the recording material in the post processing apparatus.

2. The image forming system as claimed in claim 1, further comprising a purge processing unit, wherein after the recording material that caused the conveying abnormality detected by the abnormality detection unit is removed, the purge processing unit discharges a recording material remaining in the conveying path in the image forming system to an outside of the image forming system.

3. The image forming system as claimed in claim 1, wherein in a case where the second determination unit determines that there is not any post processing apparatus in which the recording material can be stopped, the stop control unit stops the recording material without conveying the recording material to the predetermined position.

4. The image forming system as claimed in claim 1, wherein the predetermined position is a position where the recording material is not on a plurality of different conveying rollers.

5. The image forming system as claimed in claim 1, wherein the second determination unit notifies first recording material information about the recording material that is determined not to be able to be stopped at the predetermined position in the image forming apparatus by the first determination unit to a most upstream first post processing apparatus of the post processing apparatuses,
    the image forming system further includes a third determination unit that determines whether there is any recording material that the image forming apparatus is unable to stop at the predetermined position, said predetermined position being a position which avoids the location that causes the deformation of the recording material on the basis of the first recording material information, out of the recording materials that are being conveyed in the first post processing apparatus and the recording materials that are planned to be discharged from the image forming apparatus, and
    in a case where the third determination unit determines that there is a recording material that the image forming apparatus is unable to stop at the predetermined position in the first post processing apparatus, the second determination unit determines that there is not any post processing apparatus in which the recording material can be stopped at an upstream side with respect to the post processing apparatus where a conveying abnormality occurs.

6. The image forming system as claimed in claim 5, wherein the first recording material information includes a size of a recording material and a number of sheets, or a length of the recording material in a conveying direction and a number of sheets.

7. The image forming system as claimed in claim 5, wherein the first recording material information includes an entire length of all the recording materials arranged, without any space therebetween in a conveying direction, which are determined not to be able to be stopped at the predetermined positions in the image forming apparatus by the first determination unit.

8. The image forming system as claimed in claim 5 further comprising a fourth determination unit, wherein in a case where the third determination unit determines that there is a recording material that the image forming apparatus is unable to stop at the predetermined position in the first post processing apparatus, the fourth determination unit determines whether there is any post processing apparatus in which the recording material can be stopped at an upstream side with respect to the post processing apparatus where a conveying abnormality occurs and at a downstream side with respect to the first post processing apparatus.

9. The image forming system as claimed in claim 8, wherein in a case where the fourth determination unit determines that there is a post processing apparatus in which the recording material can be stopped, the stop control unit discharges the recording material that the image forming apparatus is unable to stop at the predetermined position in the first post processing apparatus to a post processing apparatus at a downstream side with respect to the first post processing apparatus and stops the recording material in the post processing apparatus.

10. The image forming system as claimed in claim 8, wherein in a case where the fourth determination unit determines that there is not any post processing apparatus in which the recording material can be stopped, the stop control unit stops the recording material without conveying the recording material to the predetermined position.

11. The image forming system as claimed in claim 8, wherein the fourth determination unit notifies second recording material information about a recording material that is determined not to be able to be stopped at the predetermined position in the first post processing apparatus by the third determination unit to a second most upstream second post processing apparatus of the post processing apparatuses, the image forming system further includes a fifth determination unit that determines whether there is any recording material that the image forming apparatus is unable to stop at the predetermined position, said predetermined position being a position which avoids the location that causes the deformation of the recording material on the basis of the second recording material information, out of the recording materials that are being conveyed in the second post processing apparatus and the recording materials that are planned to be discharged from first post processing apparatus, and in a case where the fifth determination unit determines that there is a recording material that the image forming apparatus is unable to stop at the predetermined position in the second post processing apparatus, the second determination unit determines that there is not any post processing apparatus in which the recording material can be stopped at an upstream side with respect to the post processing apparatus where a conveying abnormality occurs.

12. The image forming system as claimed in claim 11, wherein the second recording material information includes a size of a recording material and a number of sheets, or a length of the recording material in a conveying direction and a number of sheets.

13. The image forming system as claimed in claim 11, wherein the second recording material information includes an entire length of all the recording materials arranged, without any space therebetween in a conveying direction, which are determined not to be able to be stopped at the predetermined positions in the first post processing apparatus by the third determination unit.

14. The image forming system as claimed in claim 11 further comprising a sixth determination unit, wherein in a case where the fifth determination unit determines that there is a recording material that the image forming apparatus is unable to stop at the predetermined position in the second post processing apparatus, the sixth determination unit determines whether there is any post processing apparatus in which the recording material can be stopped at an upstream side with respect to the post processing apparatus where a conveying abnormality occurs and at a downstream side with respect to the second post processing apparatus.

15. The image forming system as claimed in claim 14, wherein in a case where the sixth determination unit determines that there is not any post processing apparatus in which the recording material can be stopped, the stop control unit stops the recording material without conveying the recording material to the predetermined position.

16. A conveying stop method of a recording material in an image forming system including an image forming apparatus and a plurality of post processing apparatus, the conveying stop method comprising:
(a) a step of detecting a conveying abnormality of a recording material in a conveying path of the plurality of post processing apparatuses;
(b) a step of, in a case where the conveying abnormality of the recording material is detected in the step (a), determining, based on an amount of recording material in at least a portion of the conveying path, whether there is any recording material that is being conveyed in the image forming apparatus and that the image forming apparatus is unable to stop at a predetermined position, said predetermined position being a position which avoids a location that causes a deformation of the recording material;
(c) a step of, in a case where it is determined that there is a recording material that the image forming apparatus is unable to stop at the predetermined position in the image forming apparatus in the step (b), determining whether there is any post processing apparatus in which the recording material can be stopped at an upstream side with respect to the post processing apparatus where the conveying abnormality occurs;
(d) a step of, in a case where it is determined that there is a post processing apparatus in which the recording material can be stopped in the step (c), discharging the recording material that the image forming apparatus is unable to stop at the predetermined position in the image forming apparatus to a post processing apparatus at a downstream side with respect to the image forming apparatus and stopping the recording material in the post processing apparatus.

17. A non-transitory computer readable recording medium stored with a conveying stop program of a recording material, said program causing a computer of an image forming system including an image forming apparatus and a plurality of post processing apparatuses to execute a process comprising:
(a) a step of detecting a conveying abnormality of a recording material in a conveying path of the plurality of post processing apparatuses
(b) a step of, in a case where the conveying abnormality of the recording material is detected in the step (a), determining, based on an amount of recording material in at least a portion of the conveying path, whether there is any recording material that is being conveyed in the image forming apparatus and that the image forming apparatus is unable to stop at a predetermined position, said predetermined position being a position which avoids a location that causes a deformation of the recording material;
(c) a step of, in a case where it is determined that there is a recording material that the image forming apparatus is unable to stop at the predetermined position in the image forming apparatus in the step (b), determining whether there is any post processing apparatus in which the recording material can be stopped at an upstream side with respect to the post processing apparatus where the conveying abnormality occurs;
(d) a step of, in a case where it is determined that there is a post processing apparatus in which the recording material can be stopped in the step (c), discharging the recording material that the image forming apparatus is unable to stop at the predetermined position in the image forming apparatus to a post processing apparatus at a downstream side with respect to the image forming apparatus and stopping the recording material in the post processing apparatus.

* * * * *